US008910446B2

(12) United States Patent
Oliphant et al.

(10) Patent No.: US 8,910,446 B2
(45) Date of Patent: Dec. 16, 2014

(54) STRUCTURAL SHAPE FOR WIND TOWER MEMBERS

(75) Inventors: David Oliphant, West Jordan, UT (US); Todd Andersen, Heber City, UT (US)

(73) Assignee: GE Wind Energy, LLC, Greenville, SC (US)

( * ) Notice: Subject to any disclaimer, the term of this patent is extended or adjusted under 35 U.S.C. 154(b) by 518 days.

(21) Appl. No.: 12/638,982

(22) Filed: Dec. 15, 2009

(65) Prior Publication Data

US 2010/0242406 A1 Sep. 30, 2010

Related U.S. Application Data

(60) Provisional application No. 61/122,593, filed on Dec. 15, 2008, provisional application No. 61/163,857, filed on Mar. 26, 2009.

(51) Int. Cl.
*E04C 3/00* (2006.01)
*F03D 11/04* (2006.01)
*E04H 12/10* (2006.01)

(52) U.S. Cl.
CPC ......... *E04H 12/10* (2013.01); *F05B 2240/9121* (2013.01); *Y02E 10/728* (2013.01); *F03D 11/04* (2013.01)
USPC ............................... 52/651.02; 52/40; 52/846

(58) Field of Classification Search
CPC ....... E04H 12/00; E04H 12/08; E04H 12/085; E04H 12/10; Y02E 10/70; Y02E 10/727; Y02E 10/728

USPC ............ 52/651.01, 651.02, 651.05, 651.07, 52/652.1, 653.1, 651.03, 651.04, 651.06, 52/651.08, 651.09, 40, 846; D25/126
See application file for complete search history.

(56) References Cited

U.S. PATENT DOCUMENTS

| 877,587 A | 1/1908 | Noyes |
|---|---|---|
| 889,395 A | 6/1908 | Noyes |
| RE12,842 E | 8/1908 | Noyes |
| 1,506,984 A | 9/1924 | Marshall |
| 1,626,393 A | 4/1927 | Cater |
| 1,870,914 A | 8/1932 | Lane |
| 2,014,784 A | 9/1935 | Schuler |
| 2,135,631 A | 11/1938 | Amesbury |
| 2,145,232 A | 1/1939 | Bauer |
| 2,246,151 A | 6/1941 | Vrooman |

(Continued)

FOREIGN PATENT DOCUMENTS

| DE | 194961 | 2/1908 |
|---|---|---|
| DE | 8704779 U1 | 5/1987 |

(Continued)

OTHER PUBLICATIONS

Argyriadis et al., Determination of Fatigue Loading on a Wind Turbine with Oil Damping Device, Germanischer Lloyd WindEnergie GmbH, 2004, Hamburg, Germany.

(Continued)

*Primary Examiner* — William Gilbert
(74) *Attorney, Agent, or Firm* — Dority & Manning, P.A.

(57) ABSTRACT

One of the major structural components in a space frame tower is the tower leg. A novel and nonobvious tower leg structure is provided which provides significant advantages and benefits over previously available structures.

49 Claims, 23 Drawing Sheets

(56) References Cited

U.S. PATENT DOCUMENTS

| | | | |
|---|---|---|---|
| 2,756,952 | A | 7/1956 | Gazley |
| 2,945,231 | A | 7/1960 | Scheldorf |
| 2,950,576 | A | 8/1960 | Rubenstein |
| 3,079,277 | A | 2/1963 | Painter |
| 3,100,555 | A | 8/1963 | Ashton |
| 3,119,471 | A | 1/1964 | Turner |
| 3,219,214 | A | 11/1965 | Baer |
| 3,276,762 | A | 10/1966 | Thomas |
| 3,277,614 | A | 10/1966 | Marie |
| 3,353,854 | A | 11/1967 | Hansen |
| 3,371,458 | A | 3/1968 | Sturgill |
| 3,456,972 | A | 7/1969 | Drotar |
| 3,485,005 | A | 12/1969 | Kutchai |
| 3,561,711 | A | 2/1971 | Dodge |
| 3,574,982 | A | 4/1971 | Wakonig |
| 3,618,928 | A | 11/1971 | Taylor |
| 3,634,989 | A | 1/1972 | Rogers |
| 3,650,078 | A | 3/1972 | Jennings |
| 3,650,081 | A | 3/1972 | McCracken |
| 3,659,490 | A | 5/1972 | Buck |
| 3,710,674 | A | 1/1973 | Tabor |
| 3,742,662 | A | 7/1973 | Ballou |
| 3,747,695 | A | 7/1973 | Branham |
| 3,763,617 | A | 10/1973 | Nell |
| 3,812,771 | A | 5/1974 | Yokoyama et al. |
| 3,892,398 | A | 7/1975 | Marsh |
| 3,924,056 | A | 12/1975 | Locicero |
| 3,939,988 | A | 2/1976 | Wellman |
| 4,039,050 | A | 8/1977 | Bowling et al. |
| 4,226,554 | A | 10/1980 | Vandiver et al. |
| 4,254,847 | A | 3/1981 | Kamman et al. |
| 4,261,441 | A | 4/1981 | Wood |
| 4,272,929 | A | 6/1981 | Hanson |
| 4,278,726 | A | 7/1981 | Wieme |
| 4,297,076 | A | 10/1981 | Donham et al. |
| 4,311,434 | A | 1/1982 | Abe |
| 4,312,162 | A | 1/1982 | Medney |
| 4,320,602 | A | 3/1982 | Richardson |
| 4,403,916 | A | 9/1983 | Skelskey |
| 4,406,558 | A | 9/1983 | Kochendorfer et al. |
| 4,411,114 | A | 10/1983 | Wurtinger et al. |
| 4,420,692 | A | 12/1983 | Kos et al. |
| 4,435,647 | A | 3/1984 | Harner et al. |
| 4,457,500 | A | 7/1984 | Drachenberg et al. |
| 4,515,525 | A | 5/1985 | Doman |
| 4,565,929 | A | 1/1986 | Baskin et al. |
| 4,674,954 | A | 6/1987 | Kenfield |
| 4,694,630 | A | 9/1987 | McGinnis |
| 4,743,141 | A | 5/1988 | Simensen et al. |
| 4,783,937 | A | 11/1988 | Sato |
| 4,807,840 | A | 2/1989 | Baker et al. |
| 4,856,662 | A | 8/1989 | Marvin et al. |
| 4,921,224 | A | 5/1990 | Fukumura et al. |
| 4,987,711 | A | 1/1991 | Noji et al. |
| 5,070,663 | A | 12/1991 | Sakai et al. |
| 5,203,435 | A | 4/1993 | Dolgin |
| 5,213,470 | A | 5/1993 | Lundquist |
| 5,219,051 | A | 6/1993 | Davis |
| 5,239,789 | A | 8/1993 | Uno et al. |
| 5,327,700 | A | 7/1994 | Sorenson et al. |
| 5,347,771 | A | 9/1994 | Kobori et al. |
| 5,775,049 | A | 7/1998 | Fricke |
| 5,820,348 | A | 10/1998 | Fricke |
| 5,832,688 | A | 11/1998 | Crissey et al. |
| 5,905,771 | A | 5/1999 | Erbes et al. |
| 5,946,866 | A | 9/1999 | Weglewski et al. |
| 5,956,915 | A | 9/1999 | Piper et al. |
| 6,048,426 | A | 4/2000 | Pratt |
| 6,173,945 | B1 | 1/2001 | Lindsey et al. |
| 6,287,664 | B1 | 9/2001 | Pratt |
| 6,354,576 | B1 | 3/2002 | Jacobs et al. |
| 6,397,528 | B1 | 6/2002 | Rahimian |
| 6,408,587 | B2 | 6/2002 | Cronin et al. |
| 6,438,905 | B2 | 8/2002 | Constantinou |
| 6,453,962 | B1 | 9/2002 | Pratt |
| 6,463,709 | B2 | 10/2002 | Meguro et al. |
| 6,467,521 | B1 | 10/2002 | Pratt |
| 6,522,025 | B2 | 2/2003 | Willis et al. |
| 6,578,339 | B1 | 6/2003 | McGinnis |
| 6,614,125 | B2 | 9/2003 | Willis et al. |
| 6,626,642 | B1 | 9/2003 | Veldkamp |
| 6,672,837 | B1 | 1/2004 | Veldkamp et al. |
| 6,695,588 | B1 | 2/2004 | Nielsen |
| 6,701,680 | B2 | 3/2004 | Fanucci et al. |
| 6,745,539 | B1 | 6/2004 | Heim |
| 6,782,667 | B2 | 8/2004 | Henderson |
| 6,784,566 | B2 | 8/2004 | Thomas |
| 6,789,309 | B2 | 9/2004 | Kondo |
| 6,837,010 | B2 | 1/2005 | Powell et al. |
| 6,840,016 | B1 | 1/2005 | Mualla |
| 7,015,872 | B1 | 3/2006 | Little |
| 7,040,583 | B1 | 5/2006 | Holland et al. |
| 7,062,883 | B1 | 6/2006 | Langholz et al. |
| 7,075,189 | B2 | 7/2006 | Heronemus et al. |
| 7,220,104 | B2 | 5/2007 | Zheng et al. |
| 7,392,624 | B2 | 7/2008 | Kinzer |
| 2002/0084142 | A1 | 7/2002 | Brennan et al. |
| 2003/0071468 | A1 | 4/2003 | Platt |
| 2003/0183594 | A1 | 10/2003 | Torres Martinez |
| 2005/0001131 | A1 | 1/2005 | Stevens et al. |
| 2005/0166521 | A1 | 8/2005 | Silber |
| 2005/0186076 | A1 | 8/2005 | Hessel |
| 2006/0090571 | A1 | 5/2006 | Krampitz et al. |
| 2006/0120809 | A1 | 6/2006 | Ingram et al. |
| 2006/0147306 | A1 | 7/2006 | Zheng et al. |
| 2006/0213145 | A1 | 9/2006 | Haller |
| 2006/0236648 | A1 | 10/2006 | Grundman et al. |
| 2006/0277843 | A1 | 12/2006 | Livingston et al. |
| 2007/0243063 | A1 | 10/2007 | Schellstede |
| 2011/0094180 | A1 * | 4/2011 | Huesemann .............. 52/651.01 |

FOREIGN PATENT DOCUMENTS

| | | |
|---|---|---|
| DE | 9414643.8 | 1/1995 |
| DE | 19647515 | 11/1996 |
| DE | 19741988 | 9/1997 |
| DE | 10 2005 012 817 A1 | 9/2006 |
| DE | 102005012817 A1 | 9/2006 |
| DE | 102007039957 A1 * | 2/2009 |
| EP | 1284365 | 2/2003 |
| EP | 1677006 | 7/2006 |
| FR | 2500555 | 8/1982 |
| GB | 408828 | 4/1934 |
| GB | 1008782 | 11/1965 |
| JP | 3539134078 | 1/1991 |
| JP | 10-205430 | 8/1998 |
| SU | 1421959 | 9/1988 |
| WO | 96/10130 | 4/1996 |
| WO | 97/21621 | 6/1997 |
| WO | 00/77394 | 12/2000 |
| WO | 2006/062390 | 6/2006 |

OTHER PUBLICATIONS

PCT Search Report, May 10, 2010.
Office action issued in connection with CN Application No. 200980156883.2, Jun. 28, 2013.
EP Search Report, Jun. 2, 2014.

* cited by examiner

STRUCTURAL SHAPE FOR WIND TOWER MEMBERS

CROSS-REFERENCE TO RELATED APPLICATIONS

This application claims the benefit of U.S. Provisional Application No. 61/122,593, filed Dec. 15, 2008, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

This application also claims the benefit of U.S. Provisional Application No. 61/163,857, filed Mar. 26, 2009, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING STATE OF CALIFORNIA SPONSORED RESEARCH OR DEVELOPMENT

This invention was made with State of California support under California Energy Commission grant number PIR-04-012. The Energy Commission has certain rights in this invention.

BACKGROUND

1. The Field of the Disclosure

The present disclosure relates generally to the shape of wind tower structural members.

2. Background Information

As illustrated in FIG. 1, in the wind power industry, a space frame wind tower 10 may include a plurality of tower legs, known as space frame tower legs 13. Space frame tower legs are currently made using existing structural shapes. For instance, existing structural tower legs may be made from angle iron, H-beams, pipe, and other structure comprising cross sectional shapes that are readily available. The two most common shapes used as tower legs are the angle iron and the pipe.

Referring to FIGS. 2 and 3, it will be appreciated that using a pipe 20 for the tower leg 13 allows for a single structural member, namely the pipe 20, to be used. Using a single structural member removes the complexity of having to assemble a structural leg having a shape sufficient to withstand and bear the loads that will be encountered in the wind tower.

It will be appreciated that the pipe 20 does not have sufficient structure that can be used as additional connection points, which are needed up and down the length of the leg. Typically, to create these additional connection points (an example would be for joining the bracing to the leg member) on a leg made from pipe, members or gusset plates 22 are welded at 26 to the side of the pipe 20. Welding, while not largely problematic in other industries, is a serious weak point in a tower used for supporting a wind turbine, and to overcome the induced fatigue weakness due to the weld, the wall thickness of the structural member is increased, which increases the cost of the design.

Referring now to FIGS. 4 and 5, it will be appreciated that using the angle iron design for a tower leg 13, a leg 13 can be created where welding is not required. However, in such a design a single angle iron 40 is not sufficient or ideal for a tower leg, so a "built" structural shape is needed or created for the leg 13 by bolting multiple angle irons 40 together to create a new shape as illustrated in FIG. 4. Such a design adds cost and complexity to the structure, but also avoids the need for welds, which can create a weak point in a wind tower.

With wind power demand increasing across the world, there is a need to develop a tower structure for wind turbines that is more cost efficient and that also reduces the amount of raw materials required. The present disclosure will describe structures providing such advantages as well as other advantages.

SUMMARY OF THE DISCLOSURE

One of the major structural components in a space frame tower is the leg. Normally a tower would need to have at least three legs. The cross section of the leg would depend on a number of factors like the expected functionality of the towers and the expected requirements. There are many designs which are implemented in the industry for lattice towers. An advantages of the present disclosure over existing leg cross sections in the industry as well as the parameters to be considered to maximize such advantages will be provided herein.

The leg design in existing towers is tubular. Gussets are welded to the tubular pipe and the pipes are connected in the gussets through cross bracing. The disadvantage of this design is that the gussets must be welded to the tower leg and this might cause fatigue problems in the leg. FIG. 2 shows that the gussets are not continuous along the length of the pipe and there is a gap between them because the gussets were designed just to support the cross bracing and they do not transfer the axial loads and the bending loads therethrough. So it is the pipe which supports all the axial and bending loads. This increases the overall weight of the tower. So there is a need to eliminate the welds in the gussets and at the same time bring down the weight of the tower. This has given rise to this disclosure as further discussed below.

The next generation cross section was designed keeping in mind that the limitations in the existing tower cross sections have to be overcome. The next generation leg may be designed in such a way that flanges from the structure act as support for cross bracing and also assists in transferring the axial and the bending loads. In other words, this desirable feature eliminates the need for gussets to be welded to the tower leg. One desirable attribute of the present disclosure is to eliminate welded joints in the tower leg. As the flanges of the tower serve as load path for axial and bending loads, the cross sectional area can be reduced which in turn lowers the mass of the tower.

An embodiment may include a structural member for use in the leg of a wind tower structure having a cross section comprising: two flange portions for attaching said structural member into said wind tower, a framed portion having a plurality of concave portions and a convex portion, and wherein said concave portions and said convex portion are disposed between said flange portions, and wherein said flange portions and said framed portion are extended substantially normal to the cross section thereby forming said structural member.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein said flat portion is disposed between said convex portion and said concave portion.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein said flat portion is disposed between said flange portions.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion further comprising a plurality of flat portions.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein said concave portions are adjacent to the flanges.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the ratio between moment of inertia and the area of the cross section is in the range from about 25 to about 300 $in^2$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the moment of inertia is in the range from about 800 to about 10000 $in^4$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the moment of inertia is in the range from about 1500 to about 4500 $in^4$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the area of the cross section is in the range from about 30 to about 210 $in^2$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the area of the cross section is in the range from about 50 to about 110 $in^2$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the cross section is asymmetric.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the cross section is symmetric about an axis.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein it is formed by more than one segment bonded together by a fastener across the length of the cross section.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein it is formed by just one continuous piece of material.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the length of the flange portions is in the range from about 5% to about 25% of the total perimeter of the cross section.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the length of the flange portions is substantially about 10% to 15% of the total perimeter of the cross section.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the angle between the flanges is dependant on the number of legs to be used in the wind tower structure.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the angle between the flanges is the product of 180 degrees multiplied by the number of legs to be in the final tower structure minus two, and wherein the product is then divided by two multiplied by the number of legs to be in the final tower.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the ratio between the width of the cross section and the perimeter of the frame portion is within the range from about 0.8 to about 0.15.

An embodiment may include a structural member for use in the leg of a wind tower structure having a cross section comprising: two flange portions for attaching said structural member into said wind tower, a framed portion having a plurality of concave portions and a convex portion, wherein said portions and said convex portion are disposed between said flange portions, and wherein said flange portions and said framed portion are extended substantially normal to the cross section thereby forming said structural member and further comprising a flat portion wherein the ratio between the width of the cross section and the perimeter of the frame portion is substantially about 0.02 to 0.35.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the concave portion has a radius of curvature that is less than five times but greater than a thickness of any portion of the cross section.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the convex portion has a radius of curvature that is equal to or greater than a thickness of any portion of the cross section.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the thickness of the cross section is in the range from about 0.25 to about 1.125 in.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the thickness of the cross section is in the range from about 0.375 to about 1 in.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the thickness of the cross section is in the range from about 0.4375 to about 0.875 in.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the ratio of the thickness and the perimeter of cross section is in the range from about 0.003 to about 0.02.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the ratio of the thickness and the perimeter of cross section is in the range from about 0.005 to about 0.01.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the thickness of the cross section is constant along the length of the leg.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the thickness of the cross section varies along the length of the leg.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein an angle formed between said flange portion and said frame portion ranges between about 160 degrees and about the inverse tangent of one over half of the width of the cross section of the box portion.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein an angle formed between said flange portion and said frame portion ranges between about 110 degrees and about 70 degrees An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein an angle formed between said flange portion and said frame portion is approximately 90 degrees.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion that has the ratio between about the depth dimension, length (l), of the shape and about the perimeter of the box shaped frame as $0.5 > (l/\text{box perimeter}) > 0.2$.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion most preferably around 0.33.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the outer perimeter of the cross section is in the range from about 50 in. to about 130 in.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion wherein the outer perimeter of the cross section is in the range from about from about 60 in. to about 100 in.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion made of a metal.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion fabricated by metal forming process.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion fabricated out of steel plate using a break press forming process.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion which is fabricated out of coil using a break press forming process.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion fabricated out of steel plate using a cold roll forming process.

An embodiment may include a structural member for use in the leg of a wind tower structure having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member and further comprising a flat portion fabricated out of coil using a cold roll forming process.

A wind tower having a structural member having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member.

A wind tower having a structural member having a cross section comprising: two flange portions for attaching said structural member into said wind tower, a framed portion having a plurality of concave portions and a convex portion, wherein said concave portions and said convex portion are disposed between said flange portions, and having at least three legs comprising said structural members.

A wind tower having a structural member having a cross section comprising: two flange portions for attaching said structural member into said wind tower, a framed portion having a plurality of concave portions and a convex portion, wherein said concave portions and said convex portion are disposed between said flange portions, and having five legs comprising said structural members.

A wind tower having a structural member having a cross section comprising: two flange portions for attaching said structural member into said wind tower, a framed portion having a plurality of concave portions and a convex portion, wherein said concave portions and said convex portion are disposed between said flange portions, and wherein said structural members further comprising a joining structure disposed thereon for joining.

Method of assembling a wind tower wherein the vertical height of the tower is fabricated in sections and the sections are joined together at each of the structural legs using bolts or welded joints.

A wind tower having a structural member having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member.

A wind tower having a structural member having a cross section comprising: a plurality of legs and a plurality of joints and wherein the joint between legs comprises angle irons which have one face parallel to the leg and that face is bolted to the end/top of the structural leg with the other face perpendicular to the leg and bolted to the parallel face in the other angle iron from the adjacent leg.

A wind tower having a structural member having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member.

A wind tower having a plurality of legs wherein the joint between the leg in the highest section and the tower top uses angle irons which have one face parallel to the leg and that face is bolted to the top of structural leg and the other face which is perpendicular to the leg is bolted to the parallel face in the bottom of the tower top directly or with a plate there between.

A wind tower having a structural member having a cross section comprising: two flange portions for attaching said structural member into said wind tower, a framed portion having a plurality of concave portions and a convex portion, wherein said concave portions and said convex portion are disposed between said flange portions, and wherein said flange portions and said framed portion are extended substantially normal to the cross section thereby forming said structural member.

A structural tower wherein the foundation joint between the leg in the lowest section and the ground is created using L brackets which have one face parallel to the leg and are bolted to the bottom of the structural leg and the other face is perpendicular to the leg and is bolted to the ground through struts directly or with a plate therebetween.

A wind tower having a structural member having a cross section comprising: a plurality of flanged strait portions wherein the structural member shape may be controlled by parameters, as described above, and 2 flanges, 3 curved surfaces. The ratio between moment of inertia and area is between about 50 and about 400 in$^2$ and more preferably in the range from about 60 to about 200 in$^2$. A structural shape as defined above with n=3, controlled by parameters discussed above and may comprise 2 flanges, 4-6 curved surfaces and 1 flat surfaces. The cross section may look like a U-shape with two flanges. The ratio between moment of inertia and area may be in the range from about 50 and about 400 in$^2$ and may also be in the range from about 60 to about 200 in$^2$. A structural shape as defined above with n=5 controlled by parameters above comprises 2 flanges, 4 curved surfaces and 3 flat surfaces. The cross section looks like a C-shape with two flanges. The ratio between moment of inertia and area is in the range from about 50 to about 400 in$^2$ and may also be in the range from about 60 to about 200 in$^2$.

A structural shape to be used for the main support leg members in a structural tower wherein the structural shape comprises: a structural shape having two side flanges, one to either side with an interior angle between the planes of the side flanges of from about about 105 degrees to about 120 degrees, the structural shape is not a built up or built shape but is one continuous piece of material such that a line drawn parallel to a side flange and tangent to the outermost point of the shape such that anything on the side of the tangent line closest to the flange would come in contact with the structural shape and anything on the side of the tangent line opposite from the flange would have no contact or interference with the structural shape, where the perpendicular distance separating the tangent line from the plane of the side flange is larger than the width of the cross sectional area of the side flange, and wherein the geometrical shape of the structural shape can be defined by five primary variables and both the cross sectional area and the moment of inertia can be adjusted and optimized through the use of adjustments in these five variables.

A structural shape comprising five flat panel regions including left side flange, right side flange, left channel wall, right channel wall, channel bottom.

A structural shape where the perpendicular distance separating the tangent line from the plane of the side flange is in the range from about 140% to about 150% greater than the width of flat plane of the side flange.

A structural shape where the side flanges have a flat plane width of in the range from about 10% and about 17% of the total flat panel width of the full structural shape.

A structural shape where the inner bend radius of the angles between the channel bottom flat panel and the side channel walls is from about two times to about four times the thickness of the structural shape.

A structural shape including a structural tower which can be used for supporting wind turbine systems wherein the tower comprises: five vertical structural legs and the vertical structural legs are fabricated according to the structural shape.

A structural tower where the vertical height of the tower is fabricated in sections and the sections are joined together at each of the structural legs utilizing three to five of the flat panel regions of the structural shape.

A structural tower as defined above where the joint between legs is created through the use of a slip critical friction joint with the joint created between an outer joint plate and the structural leg, and a second friction interface between the structural leg and an inner joint plate with the friction being created through the use of tension bolts.

A structural tower where the joint between the legs is created through the use of an outer joint plate, the structural leg, and an inner joint plate, with the three plates joined together with an interference bolt and the interference bolt is in double shear and the translational movement between the plates is arrested because of the interference fit.

A structural tower as defined above where the ability to level the tower as sections are assembled to each other is created through the use of both interference fit joints combined with friction joints, with the friction joints designed into the tower at selected joints between legs allowing for an adjustment of the relative alignment of each of the tower legs with relationship to each other.

A structural tower as defined above where the ability to level the tower as sections are assembled to each other is created through the use of sets of joint plates where each set has an incremental difference in the distance between the holes for joining to a first structural leg and the holes for joining to a second structural leg.

A structural tower as defined above where there is a flange welded to the end of the structural legs where the flange is perpendicular to the axis of the leg and the flanges from adjoining legs are parallel and bolted together through use of a tension bolt joint design.

A structural tower as defined above where there is a flange bolted to the end of the structural legs where the flange face is perpendicular to the axis of the leg and flanges from adjoining legs are parallel and bolted together through use of a tension bolt joint design.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
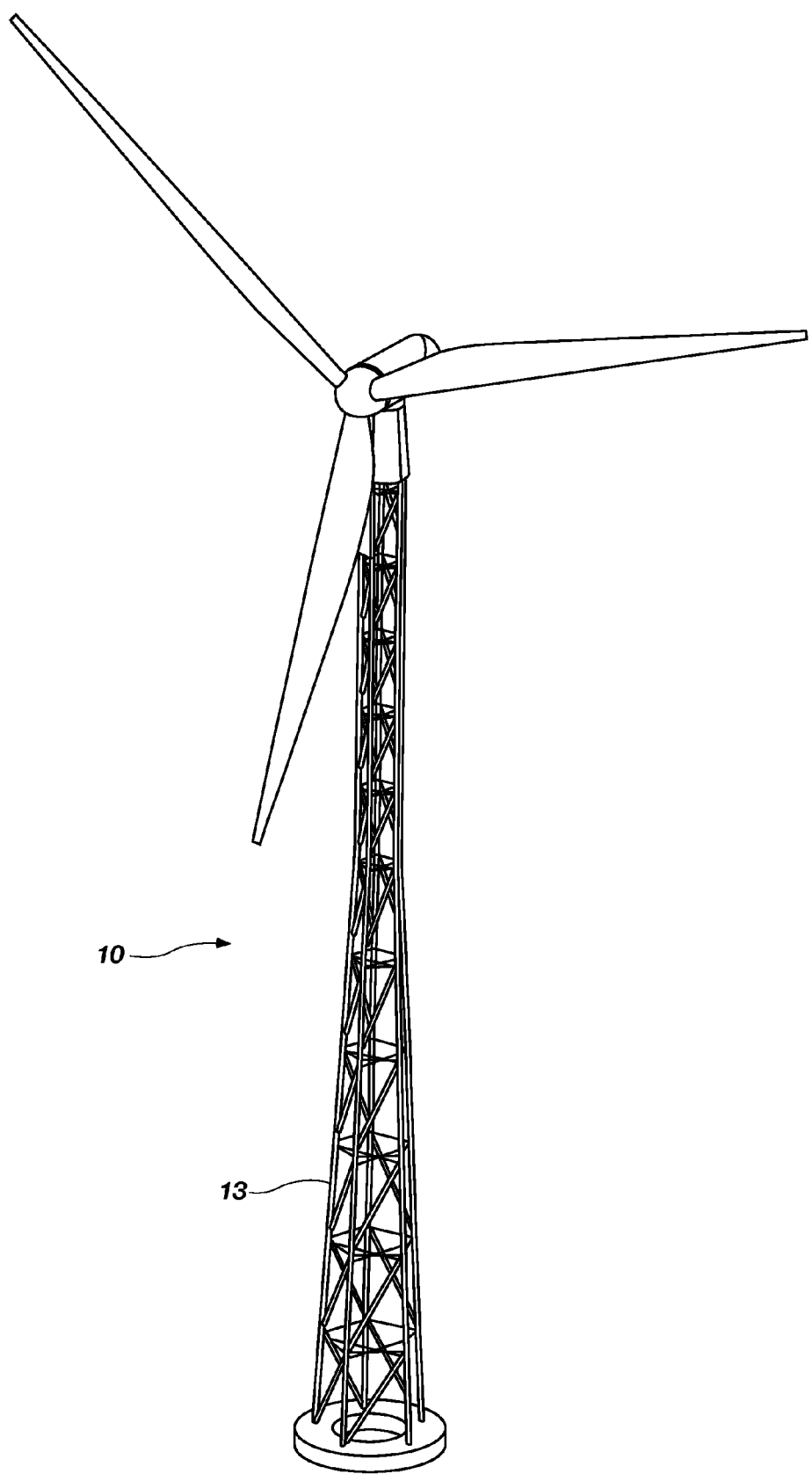
FIG. 1 is illustrative of a space frame wind tower.
Figure 2:
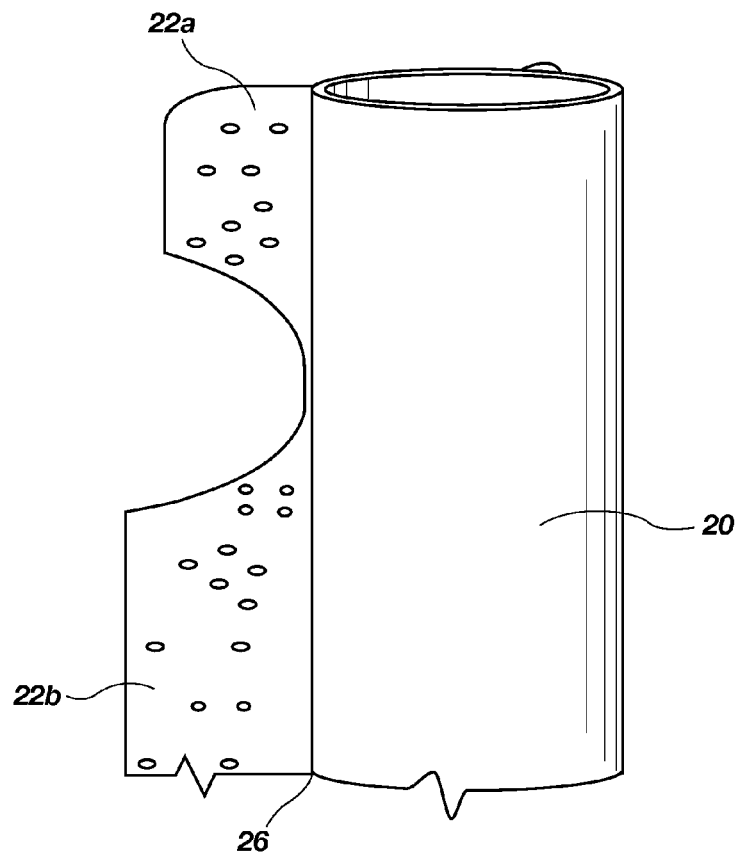
FIG. 2 is illustrative of a pipe gusset leg member.
Figure 3:
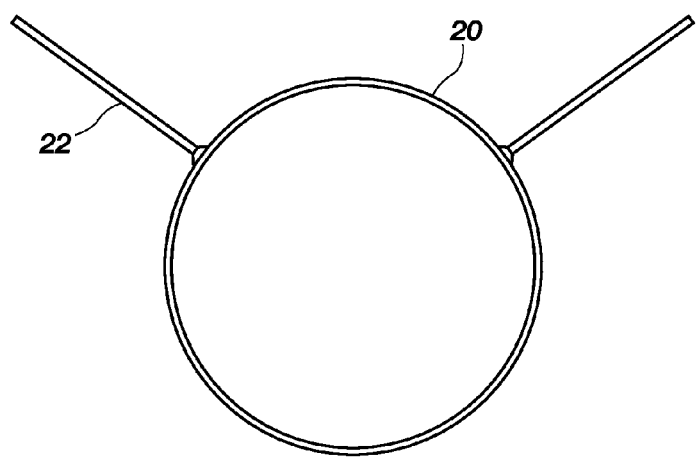
FIG. 3 is illustrative of a pipe gusset leg member.
Figure 4:
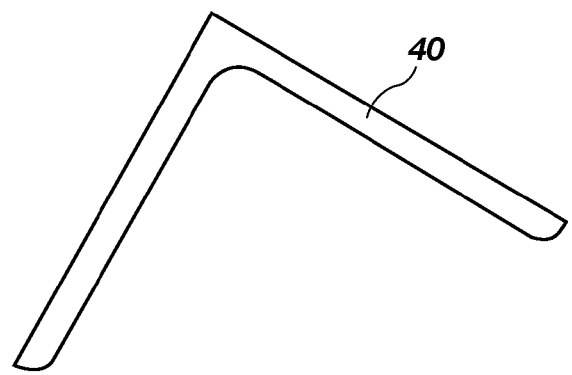
FIG. 4 is illustrative of an angle iron cross section.
Figure 5:
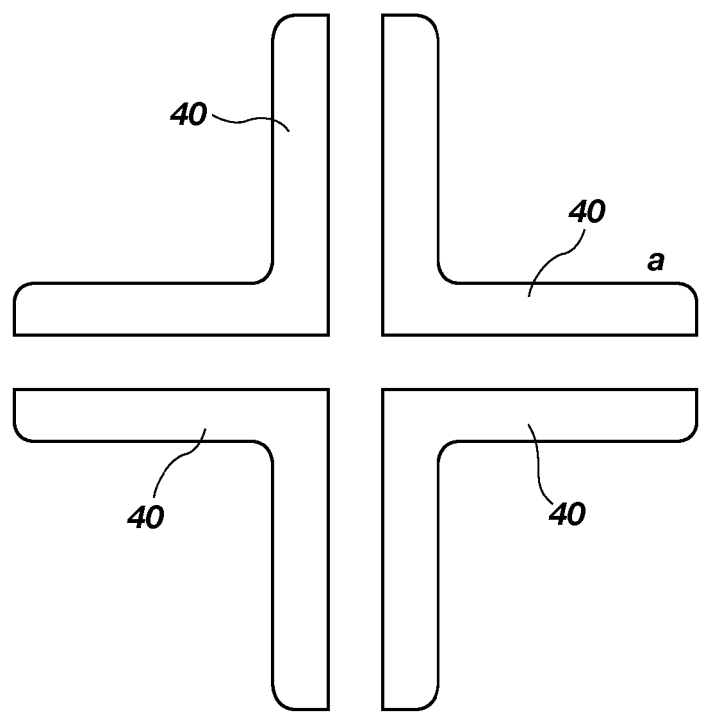
FIG. 5 is illustrative of a built up leg member.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Figure 6:
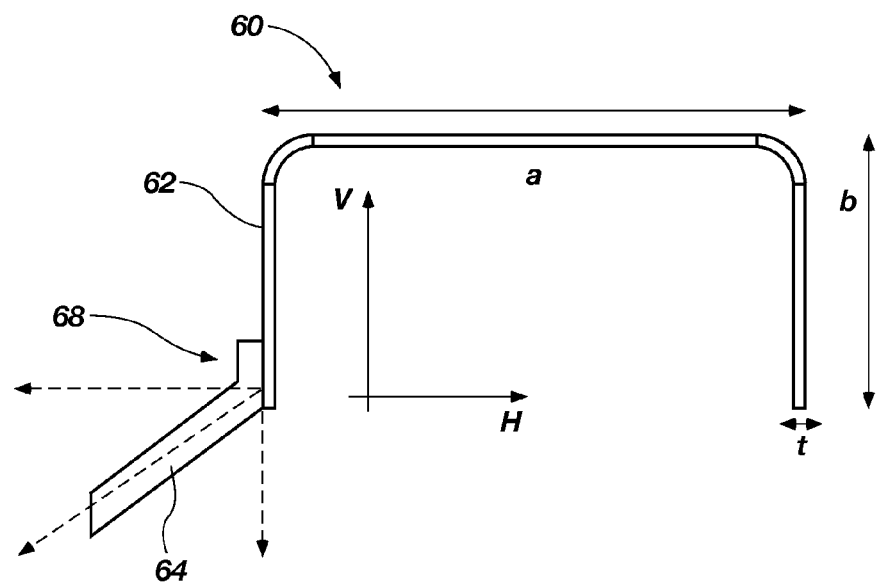
FIG. 6 is illustrative of a cross section of a structural member.

Referring to FIG. 6, a structural member 60 consistent with the features and benefits of the disclosure will be discussed. The structural member 60 may be designed from a cross section for distributing the mass making up the structural member 60 further from the centroid of cross section. The structural member 60 as illustrated in cross sectional form in the figure may comprise a framed portion 62 and flange portions 64. The flange portion 64 may be configured with various attachment enabling structures that allow other structures to be attached thereto and thereby be supported by said box portion 62. The actual structural member 60 is formed by extending material substantially normal to the disclosed and discussed cross section illustrated in the figure. The flange portion may be continuous along the length of the extended framed portion 62, or may be formed of smaller segments that are affixed to a framed portion along its lengths.

One of the benefits from the design of the embodiment of the structural member for use in a tower leg is to maximize the moment of inertia while minimizing the cross sectional area. The cross sectional area determines the amount of material that must be used to form the shape over a length in the $3^{rd}$ dimension. The total stress in a leg is the summation of the axial stress due to substantially normal forces and the bending stress due to a large moment force. Since the bending moment is normally higher the design may be governed by the bending loads. The stress response from the bending moment is inversely proportional to inertia and is given by the equation:

$$s(y)=M \cdot y/I$$

Where I is the second moment of inertia; M is the bending moment; and y is the distance from the neutral axis or centroid. It may be inferred that a greater moment of inertia results in lower stresses being transmitted and propagated throughout the tower. It is a well known fact that the moment of inertia increases as the mass is distributed away from the centroid and decreases as the distribution of mass is closer to the centroid.

Figure 7:
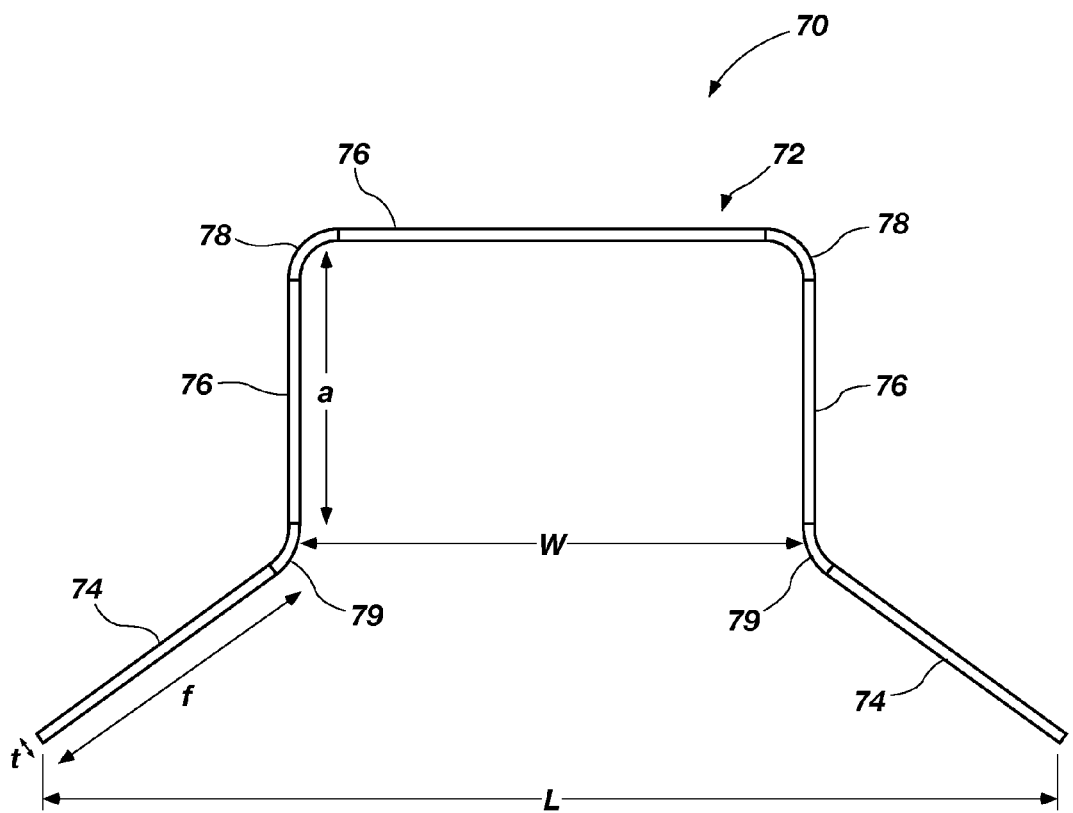
FIG. 7 is illustrative of a cross section of a structural member formed from single material.

The shape of an embodiment of a structural member 70 cross section illustrated in FIG. 7 is broadly divided into two regions; flanges or flange portions 74 and box shaped frame portions 72. The box shaped frame 72 may further divided into flat surfaces 76 and concave & convex surfaces 78 and 79 respectively. The box shaped frame 72 may be the central structure for providing the primary support for the structural member 70. A flange 74 which extends to form the flanges may look like "wings" attached to the structural member and allow for increased attachment options without the use of welds which can weaken the structural member. A continuous flange 74 may also provide supportive structure within the structural member at the greatest distance from the centroid or center of mass. In other words, the flange portions may provide attaching means and structural integrity.

When designing a structural member the total number of flat surfaces 76 can be from 2 to n, and the total number of curved surfaces 78 and 79 can be from 1 to m, wherein n and m are variables representing a count of their respective objects. The curved surfaces 79 adjacent to the flanges are concave shaped surfaces or in other words the concave surfaces act as a connector between the framed shaped portion 72 and the flanges 74. The remainder of the curved surfaces can be convex. The area of the cross section may be such that the structure does not undergo buckling or fail due to global axial loading, and the moment of inertia of the cross section has to be such that the structure does not fail due to a global bending moment. The parameters controlling the shape should be optimized so that the cross sectional area is a minimum while the the the moment of inertia is at a maximum relative to the material available.

There are no limitations on the number of surfaces n of the shape. As the number of surfaces n is increased more variations are possible. At the same time it will be appreciated that the complexity of the part is proportional to increases the cost of fabrication. Typically a tower leg with the proposed shaped structural members may be manufactured by metal forming processes with the appropriate raw material. Some of these processes include roll forming and brake press forming. It is within the scope of this disclosure to consider forming processes having a plurality of processes for manufacture and quality control.

Based on the design requirements of functionality and cost factor, a structural member for use in a leg member of a tower may be designed with five flat surfaces (n=5) for optimal performance and cost savings in an embodiment. In certain embodiments there may be a total of 6 control parameters which determine the shape of the cross section when n=5. The parameters are illustrated in the Table 1 below.

TABLE 1

Parameters for structural shape cross section

| Dimension | Parameter |
|---|---|
| l | Maximum length of the box frame between any 2 points |
| w | Maximum width of the box frame between any 2 points |
| t | Thickness of the shape |
| theta | Angle between left flat channel and the horizontal axis H |
| rce/rcx | Radius of curvature of concave/convex surfaces |
| f | Length of flange |

As explained above, there is no limitation to building and designing a cross sectional shape with other n values. The parameters which may control the shape are illustrated in the Table 2 below. The structural composition of each shape is illustrated in Table 3 below.

TABLE 2

Parameters controlling each structural shape design.

| Shape | Parameter |
|---|---|
| n = 2 | f, w, t, rce/rcx |
| n = 3 | f, w, t, rce/rcx, l |

TABLE 2-continued

Parameters controlling each structural shape design.

| Shape | Parameter |
|---|---|
| n = 4 | f, w, t, rce/rcx, l, theta |
| n = 5 | f, w, t, rce/rcx, l, theta |

Table 3 bellow illustrates the relationship of shapes as n increases, thus allowing a cross sectional shape to be fine tuned for desirable characteristics.

TABLE 3

Structural composition of each shape

| Shape | Flanges | Curved surfaces | Flat surfaces |
|---|---|---|---|
| n = 2 | 2 | 3 | 0 |
| n = 3 | 2 | 4 | 1 |
| n = 4 | 2 | 3 | 2 |
| n = 5 | 2 | 4 | 3 |

From Table 2 it can be observed that as the number of flat surfaces (n) increases the number of parameters required to control the shape increase or in the least remain the same due to increased complexity. From Table 3 it can be observed that the summation of flanges and flat surfaces matches with the parameter n.

Features of the present disclosure may optimize the cross sectional area. In an embodiment of a design approach one would determine what would be the required moment of inertia along the horizontal and vertical axis of the cross section. Such a methodology may be used to determine dimensional aspects of the design depending on the global loads it must be designed to withstand. Another process might be to determine the desired thickness (t) of the cross section and thereby provide a dependent variable for the process. Thickness (t) may generally be governed by the bearing loads in the bolted connections and buckling likelihood under suspected loads. The radius of curvature in the curved portions 78 and 79 may have a lower limit with dealing with forces because it may depend on the thickness (t). The width (w) of the shape has a lower limit which depends on the minimum gap required to work within the boundary of the shape with tools used to tighten the bolted connections between structural members forming a leg.

Figure 23:
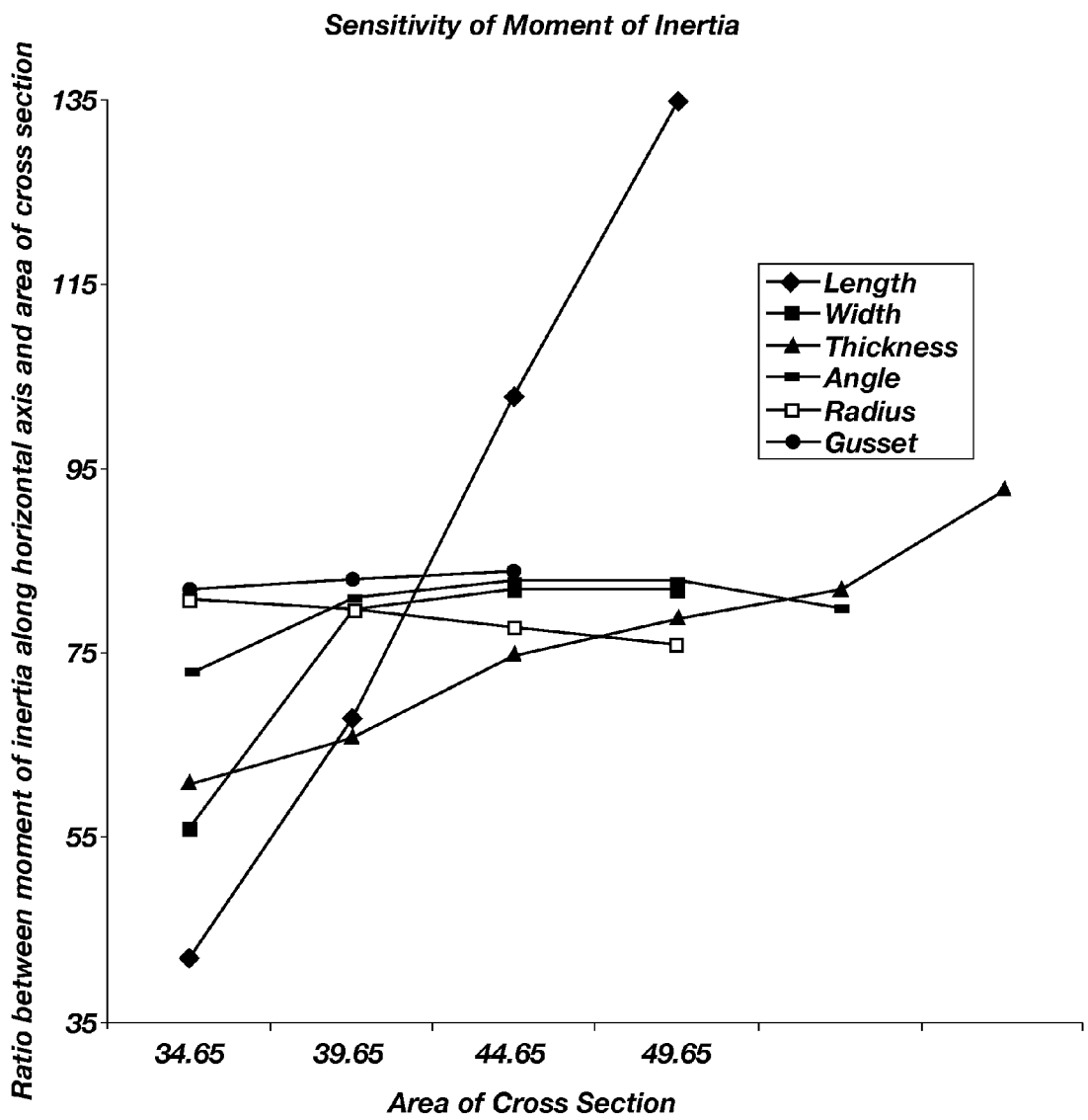
FIG. 23 is a graphical representation of cross sectional study results.
Figure 24:
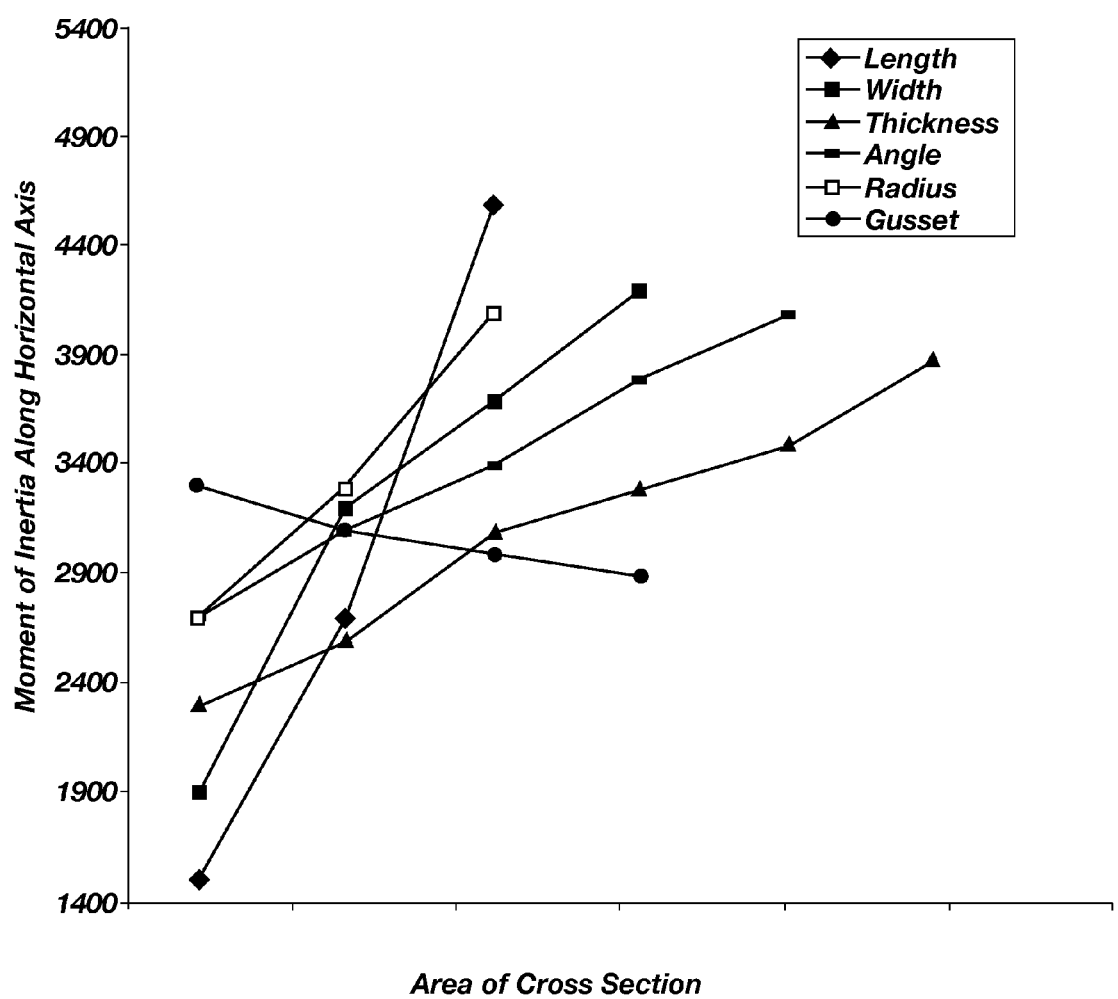
FIG. 24 is a graphical representation of cross sectional study results.

A sensitivity analysis has been carried to find out which parameter may bring out the maximum change in the moment of inertia while there is a minimum increase in the area overall area of the cross section. Each of the parameters were varied while keeping the other remaining five parameters constant. In FIG. 24 the moment of inertia along H-axis (in$^4$) is plotted with the area (in$^2$). In FIG. 23 the ratio between moment of inertia along H-axis and area (in$^2$) is plotted with area (in$^2$). It is observed in both the plots that the contribution towards moment of inertia per unit area (along H-axis) may be the maximum when the length (l) of the cross section is increased. In a separate study it is observed that the moment of inertia per unit area is the maximum when the width (w) of the cross section is increased.

From the above it will be appreciated that to have an optimized shape which has the minimum area, the moment of inertia along the horizontal and vertical axes may be controlled by the respective parameters and all other design parameters f, theta, rce/rcx, t may be kept at a minimum so that they do not contribute towards an increase in area and thus the mass of the structural member.

A wind tower is subjected to bending, substantially normal and torsional loads. The bending loads are high and they govern the design of the leg. The structural shape of the present disclosure is designed so that the two side flanges from the structure act as support for cross bracing and also function as part of the full structural shape in transferring the axial and the bending loads. By designing the side flanges as part of the structural shape the need for separate welded/bolted gussets to the structural leg for attaching bracing is eliminated. This feature reduces the total amount of steel required in a wind tower structure design. In prior leg designs the gussets transfer loads from cross bracing only, and therefore predominantly only utilized for the torsional loads in the tower. It should also be noted that the weld process creates stress foci by changing the nature of the material, usually steel, into a harder but less resilient form. This change in nature can cause laminar force distribution that is typically evenly distributed throughout a structure to concentrate in focused areas as the force refracts due to changes in the nature of the material the force is being transmitted through. Accordingly, a greater amount of homogeny in the the material results in more predictable force distribution, thereby prolonging the life of the structure.

An embodiment may place an emphasis on the length of the side flanges. The side flanges of the present structural shape function as both a structural part of the leg shape and also as the attachment area for the bracing in the tower. The length of the side flanges (dimension f in FIG. 7) should be sufficient to allow enough interface area for the bracing members to bolt or connect. The angle that the bracing approaches the leg may influence the interface area needed on the side flanges but generally the combined cross sectional area of both side flanges should represent about 10%—about 40% or about 20%—about 28% of the total cross sectional area of the present leg structural shape.

An embodiment of a method of design may concentrate on the Constant thickness throughout the cross section. The present structural shape has a constant thickness to allow for multiple fabrication methods that may include cold forming through rolling or break pressing.

An embodiment may employ a method of design focused on a recessed side flange attachments point. The present structural shape is designed so that a line running parallel to the side flange which is tangent to the further most point of the structural shape, maintains a distance equal to about 100% to about 180% or about 140% to about 150% of dimension a of FIG. 7.

Figure 8:
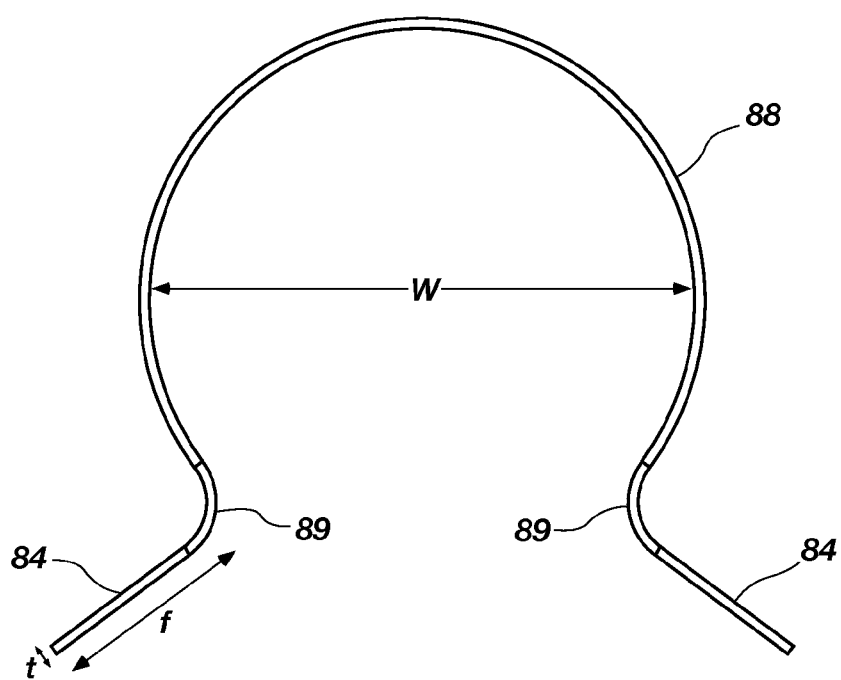
FIG. 8 is illustrative of a cross section of a structural member having a circular frame portion.

Other cross section shapes are possible in addition to that illustrated in FIG. 7. These cross section shapes are illustrated in FIGS. 8-14. FIG. 8 illustrates circular cross section of the framed portion 88 having width w. Flanges 84 may be disposed on either side of the framed portion 88 and may comprise radiused convex or concave portions 89 connecting said flanges 84 with said framed portion 88. The flanges may have length configured to receive various attaching members. The structural member cross sections may be defined by thickness, wherein it may be constant or variable across the cross section.

Figure 9:
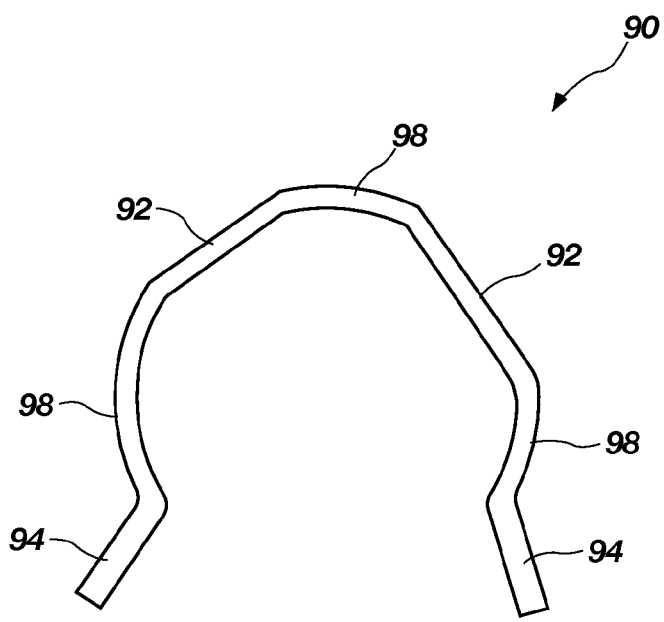
FIG. 9 is illustrative of a cross section of a structural member.
Figure 10:
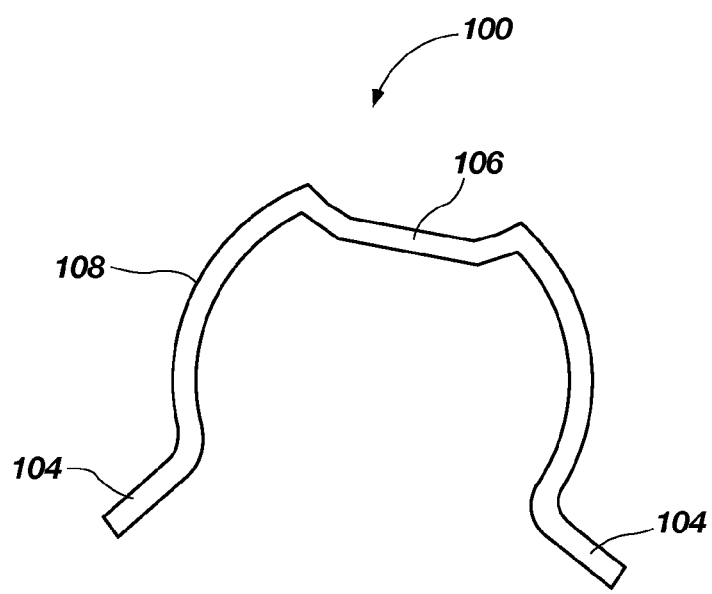
FIG. 10 is illustrative of a cross section of a structural member.

FIG. 9 illustrates a structural member cross section 90 having a framed portion comprising alternating flat 92 and curved 98 portions. Also illustrated in the cross sectional view are flanges 94 disposed on opposite ends of the framed portion. FIG. 10 illustrates a structural member cross section 100 having convex portion 106 disposed between concave portions 108. The illustrated embodiment may also comprise flanges 104 disposed on opposing ends of the cross section.

Figure 11:
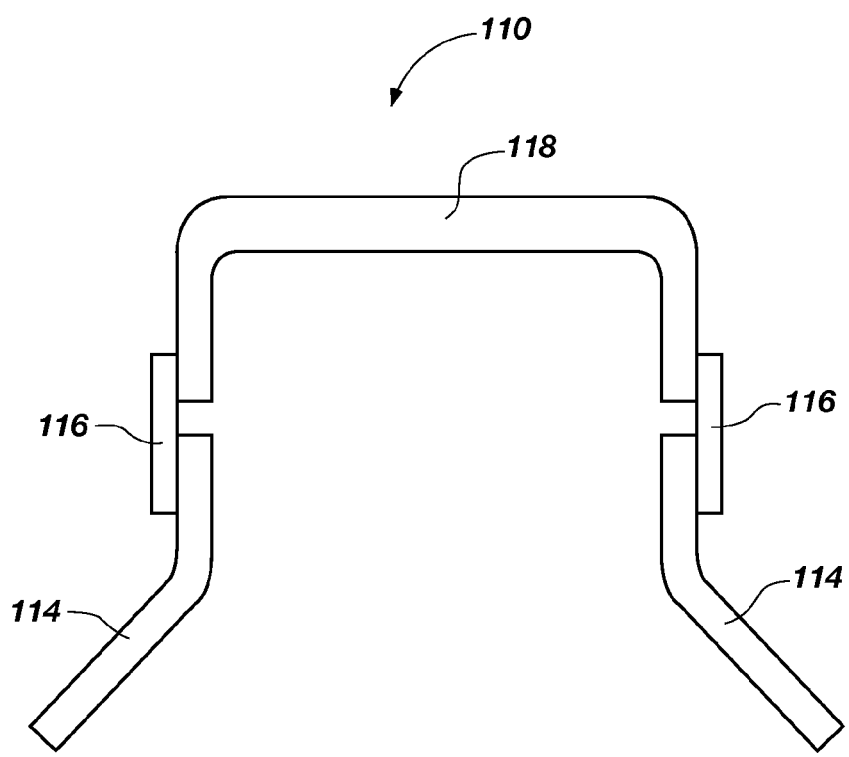
FIG. 11 is illustrative of a cross section of a structural member.

FIG. 11 illustrates a structural member cross section comprising assembly of more easily formed shapes, or shaped members that are common in the industry. The embodiment may comprise angular pieces 114, flat pieces 116, and a "c" channel piece forming a framed portion. The components may be assembled in to a structural member on site while erecting a wind tower. The components may also aid in the repair of a wind tower wherein the repair portion of the wind tower may need an unassembled structural member to fit a constrained space.

Figure 12:
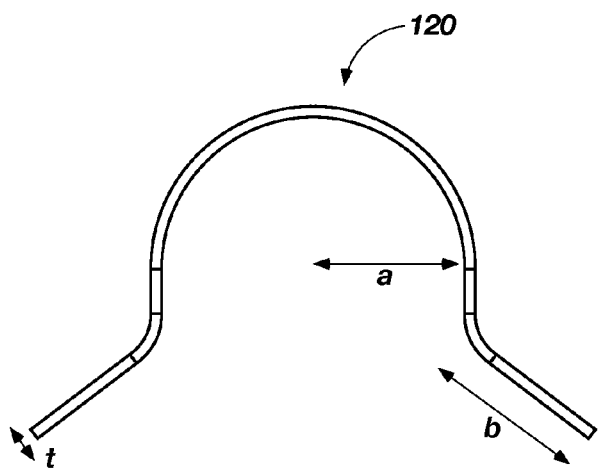
FIG. 12 is illustrative of a cross section of a structural member.

FIG. 12 illustrates a structural member cross section 120 wherein the radius of the framed portion is defined by "a", and the flange portion is defined by "b", and the thickness of the cross section is defined by "t" such that major components of the structural member 120 are defined having an adjustable ratio for fine tuning the structural member 120 for specific loads and applications.

Figure 13:
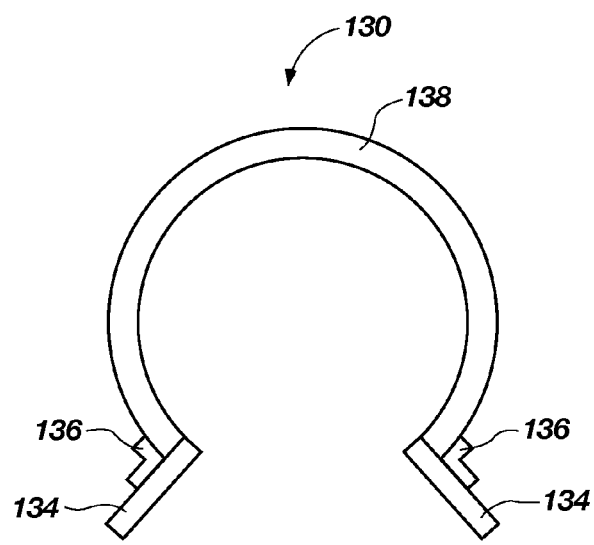
FIG. 13 is illustrative of a cross section of a structural member.

FIG. 13 illustrates a structural member cross section comprising a circular framed portion 138 having flanged portions 134 connected thereto by brackets 136 thereby forming the structural shape 130 comprised of individual components. The embodiment may be defined by separate flange portions 134 such that the flange portions are not made of continuous material but of separate materials. An embodiment may call for different material selections for the components in order to provide flexibility in fine tuning the characteristics of the structural shape 130.

Figure 14:
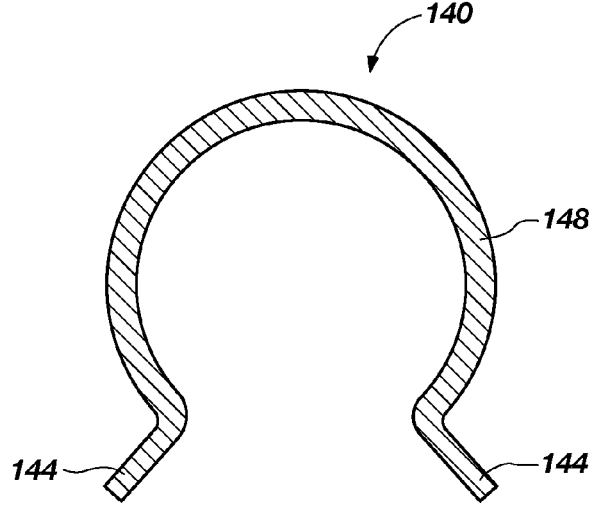
FIG. 14 is illustrative of a cross section of a structural member.

FIG. 14 illustrates an embodiment of a structural member cross section 140 wherein a framed portion 148 and any flanged portions 144 are fabricated from a single kind of material. As discussed above, single kind of material may have homogeneous properties that transfers forces readily there through.

Figure 15:
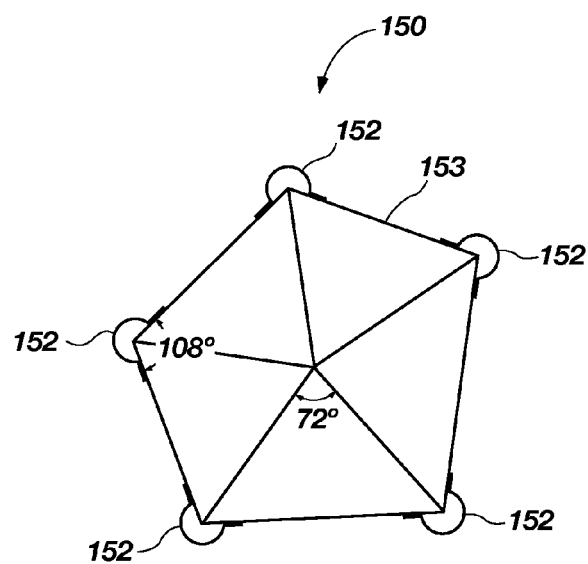
FIG. 15 is illustrative of a cross section of a structural wind tower.

FIG. 15 illustrates a top down cross sectional view of an embodiment of a wind tower 150 showing how a tower comprising five leg members 152 designed a consistent with the structural shape members discussed above. As can be seen in the figure, the leg members are joined by cross members 153 one to another thereby forming a rigid structure with improved structural members having better distribution of forces therein. The angles formed by the components may dictate the number of leg members available for use in the structure. For example, in an embodiment it may be desirable to have a structural tower under a biased load thereby providing increased rigidity within a structural tower.

Figure 16:
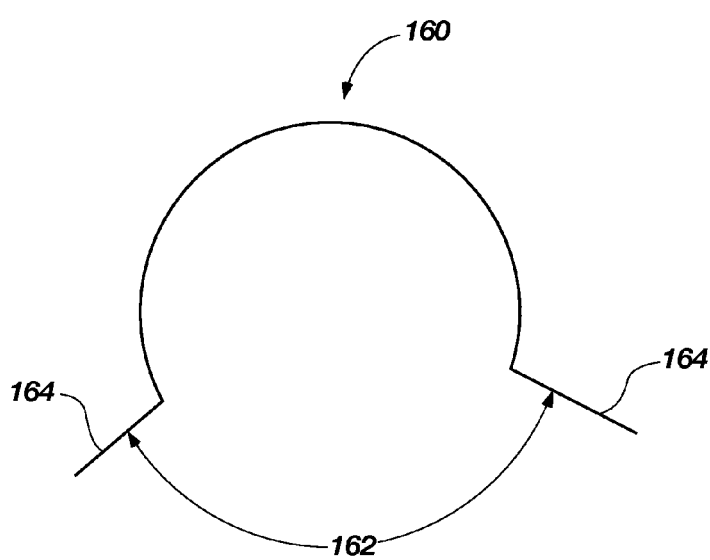
FIG. 16 is a schematic illustrating the calculation of the angle dimensions.

FIG. 16. Illustrates an embodiment of a profile of cross section of a structural member wherein an angle 162 formed by opposing flanges 164 is determined, such that the number of legs to be used in constructing a wind tower is constrained by the angle 126 formed by the flanges. The equation 180 (N-2)/N may be employed to design the structural members and their characteristics in responding to loads where N is the number of legs in a wind tower design. In the illustrated embodiment for example wherein the desired number of legs is six (6) the equation would be:

Angle=180 (6−2)/6=120 degree angle defined by the flange portions 164. Accordingly a tower made of six legs would comprise legs made up of structural members have 120 degree angles defined by the flanges of the structural member.

Figure 17:
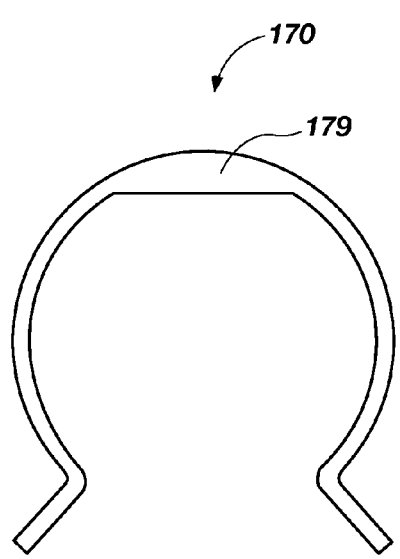
FIG. 17 is illustrative of a cross section of a structural member.

FIG. 17 illustrates an embodiment of cross section of a structural member 170 having a varying thickness 179 of material throughout the cross section. A variable thickness may provide the advantage of fine tuning structural members to respond to a specific loading within a tower structure.

Additionally, variable thickness may provide low manufacturing costs by allowing or accommodating deformation of the material during the forming process. For example: during roll forming, cold or thermal aided, uniformity of composition of the material being worked may be imperfect thereby resulting in some inconsistent thickness along the cross section 170 as illustrated in the figure. An embodiment of a structural member may have a cross sectional shape designed to compensate for the short comings of some forming processes. In other words, a structural member may be designed wherein inconsistencies are allowed to form is less tolerance critical portions so that more tolerance critical portions of the structural shape may be preserved with tighter tolerances.

In an embodiment a second forming process may be employed to provide a more precise tolerance wherein after a first process has been performed such as roll forming, a second process employing a press brake may be performed on the structural member to further and more precisely shape the structural member. The embodiment may further allow non-uniformity at various cross sections along the length of the structural member in a predictable manner such that the refining process of the press break can be employed in a more uniform fashion from one structural member to the next structural member.

In an embodiment multiple press brake processes may be employed in succession or assembly line fashion to form a structural member. For example, a first press brake process may form a first deformation or bend in a material, the deformed piece is then changed in orientation relative to the press brake, a second press brake process may then be performed causing a second deformation of the piece. An embodiment of a structural member having n number of flat portions separated by m number of curved portions may require n+m processes to fully form a structural member. Alternatively, flat material stock may only require m number of processes as the flat portions plus flanges are derived from the original flatness of the raw material.

Figure 18:
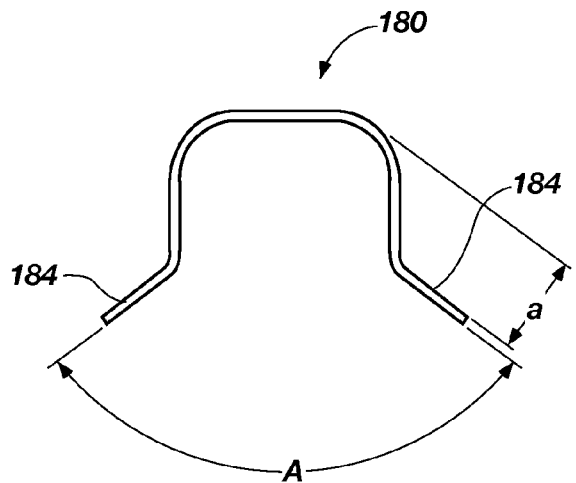
FIG. 18 is illustrative of a cross section of a structural member.

FIG. 18 illustrates an embodiment of cross section of a structural member 180 wherein opposing flanges 184 form an angle A in the range of 100 degrees to 130 degrees. Also illustrated in the embodiment is dimension "a" that represents the allowable width of any connecting members thereby allowing cladding to be placed around the tower.

It is a well known fact that inertia increases as the mass is distributed away from the centroid and decreases as the distribution of mass is closer to the centroid. An analysis of different cross sections reveals that the present disclosure cross section has the greatest distribution of mass away from the centroid and so this is the optimum design.

The inertia of the different shapes is kept as a constant to compare the different areas of different cross sections. This feature enables quantification of the proportionate increase in area. For a fixed inertia I1 along axis 1 and inertia I2 along axis 2 for area A for the present disclosure leg the areas for other cross sections are illustrated in Table A below. For each shape the following optimization rule was applied and typical design limits were set as constraints such as Minimize area while constraining the other variables to:

$I_x = I_y$ is at least 3500 in$^4$

Max distance from centroid=12 in.

TABLE A

Area for different shapes.

| Shape | Area |
|---|---|
| Present Disclosure | 1 A |
| Current (prior art) Leg | 1.56 A |
| Semi circular | 1.32 A |
| V-shape | 2.43 A |
| Angle cross section | 1.81 A |

The dimensions that are needed to define the different cross sections are illustrated in FIG. 12. A main difference between the present disclosure structure and other cross sections is that the present disclosure structure provides more control in distributing the material away from the centroid providing a larger number of parameters or options for defining the shape of the cross section. Also the moment of inertia of each shape is arrived by dividing the cross section into regular shapes which have pre-defined moment of inertia values. Table B below illustrates the number of regions and the number of dimensions for each shape. Of the shapes explored, the present disclosure cross section has the maximum number of regions and dimensions to define.

TABLE B

Dimensions and number of regions in each cross section.

| Shape | Dimensions | No. Regions |
|---|---|---|
| Structural Member | 5 | 3 |
| Current (Prior Art) Leg | 3 | 1 |
| Semi circular | 3 | 3 |
| V-shape | 2 | 2 |
| Angle cross section | 3 | 4 |

As can be seen in the table the disclosed structural member provides increased options for providing a structural member having a cross sectional shape and area that can be fine tuned for any given application by simply varying the appropriate variable or dimension that characterizes the structural member.

Figure 19:
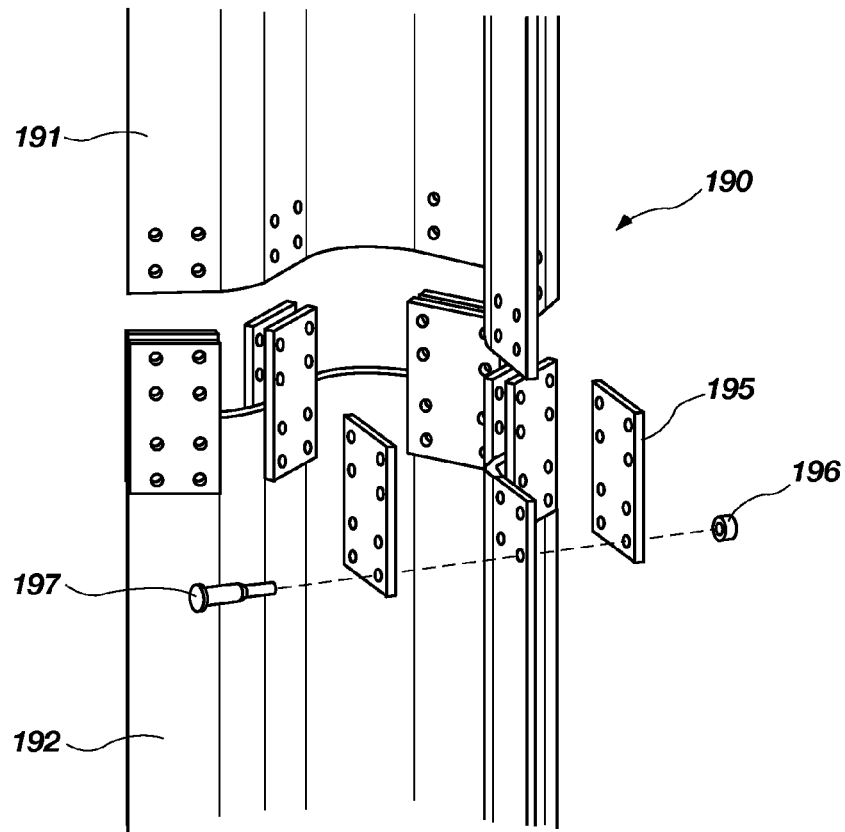
FIG. 19 is illustrative of splicing structural members.

FIG. 19 illustrates the joining or splicing of two structural members in the formation of a wind tower leg in a space frame wind tower. Splicing allows for the connection of a first structural member 191 to be placed upon a second structural member 192 thereby forming a leg or leg segment 190. After aligning the first and second structural members, splicing or connecting plates 195 may be used to splice the structural members together. The connecting plates 195 may be paired so as to provide a pressure fit such that the spliced ends of the structural members are sandwiched between the connecting plates 195. A fastener 197 having a secondary component 196 may be used to provide the fastening of the spliced components. The fasteners 197 may be of interference fit type. A standard bolt nut combination may also be used. In an embodiment of an assembly method a user may first use a common bolt and nut combination to first align the splicing components and then replace said bolt and nut combination with interference fit fasteners that are more wear resistant.

Figure 20:
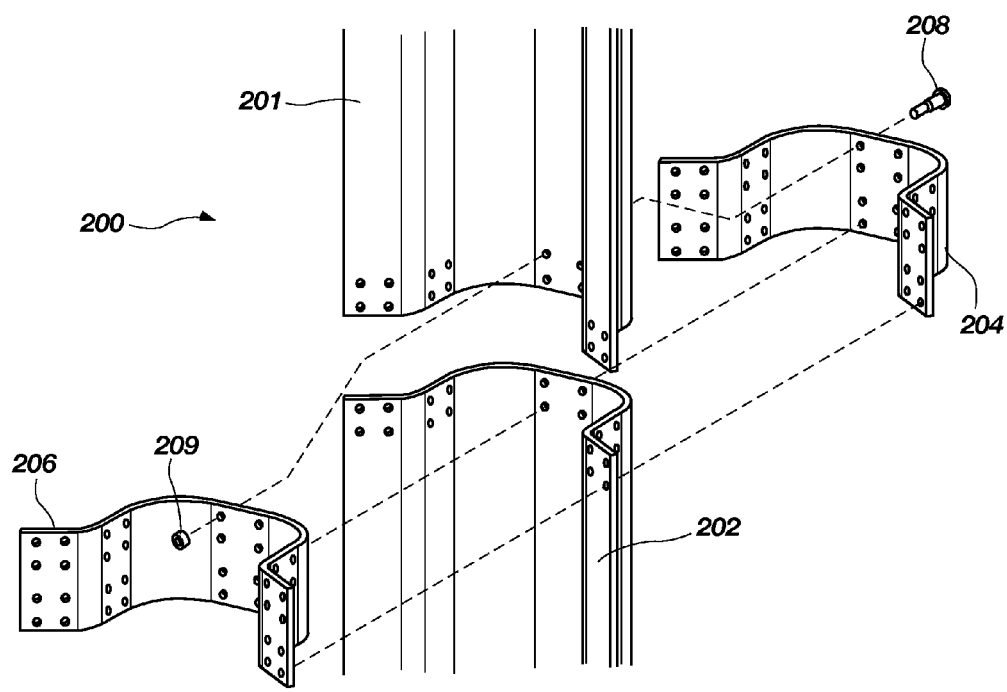
FIG. 20 is illustrative of splicing structural members.

FIG. 20 illustrates the joining or splicing of two structural members in the formation of a leg in a space frame wind tower. Splicing allows for the connection of a first structural member 201 to be placed upon a second structural member 202 thereby forming leg portion 200. After aligning the first and second structural members splicing or connection plates 204 and 206 may be used to splice the structural members together. The connection plates 204 and 206 may be paired so as to provide a pressure fit such that the spliced ends of the structural members sandwiched between the connecting plates 204 and 206. The present embodiment illustrates a connecting plate having a profile similar to the profile of the structural members. A fastener 208 having a secondary component 209 may be used to provide the fastening of the spliced components. The fastener 208 may be of interference fit type. A standard bolt and nut combination may also be used. In an embodiment of an assembly method a user may first use a common bolt and nut combination to first align the splicing components and then replace said bolt and nut combination with interference fit fasteners that are more wear resistant.

Figure 21:
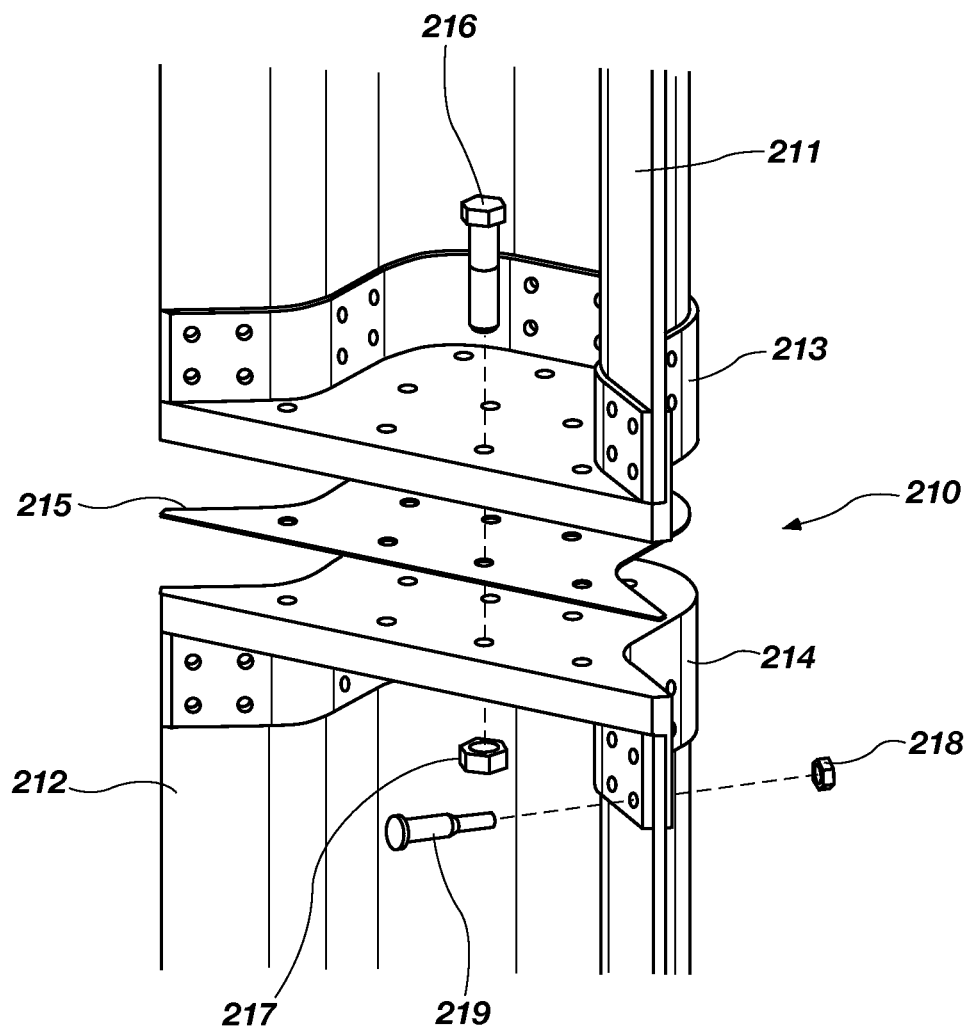
FIG. 21 is illustrative of splicing structural members.

FIG. 21 illustrates the joining or splicing of two structural members in the formations of a leg in a space frame wind tower. Splicing allows for the connection of first structural member 211 to be placed upon second structural member 212 thereby forming a leg portion 210. After aligning the first and second structural members, splicing or connecting end plates 214 and 213 may be fitted and attached to the facing end portions of the first and second structural members and are then used to splice the structural members together. The connecting end plates 213 and 214 may be paired so as to provide pressure fit such that the spliced ends of the structural members abut one another. The present embodiment illustrates connecting end plates having a channel with profile similar to the profile of the structural members so as to receive the end of the structural members therein. A fastener 216 having a secondary component 217 may be used to provide the fastening of the splicing components. A fastener 219 and a secondary fastener component 218 may be used to a affix the connecting end plates to the respective structural members. The fasteners may be of interference fit type. A standard bolt and nut combination may also be used. A shim 215 may be employed between said first and second structural member ends thereby providing some adjustability in the leg construction in order to provide alignment of the wind tower during construction. The shim 215 may also be composed of a material with predetermined properties so as to reduce forces transmitted throughout the wind tower such as a dampening feature. In an embodiment of an assembly method a user may first use common bolt and nut combination to first align the splicing components and then replace said bolt and nut combination with interference fit fasteners that are more wear resistant.

Figure 22:
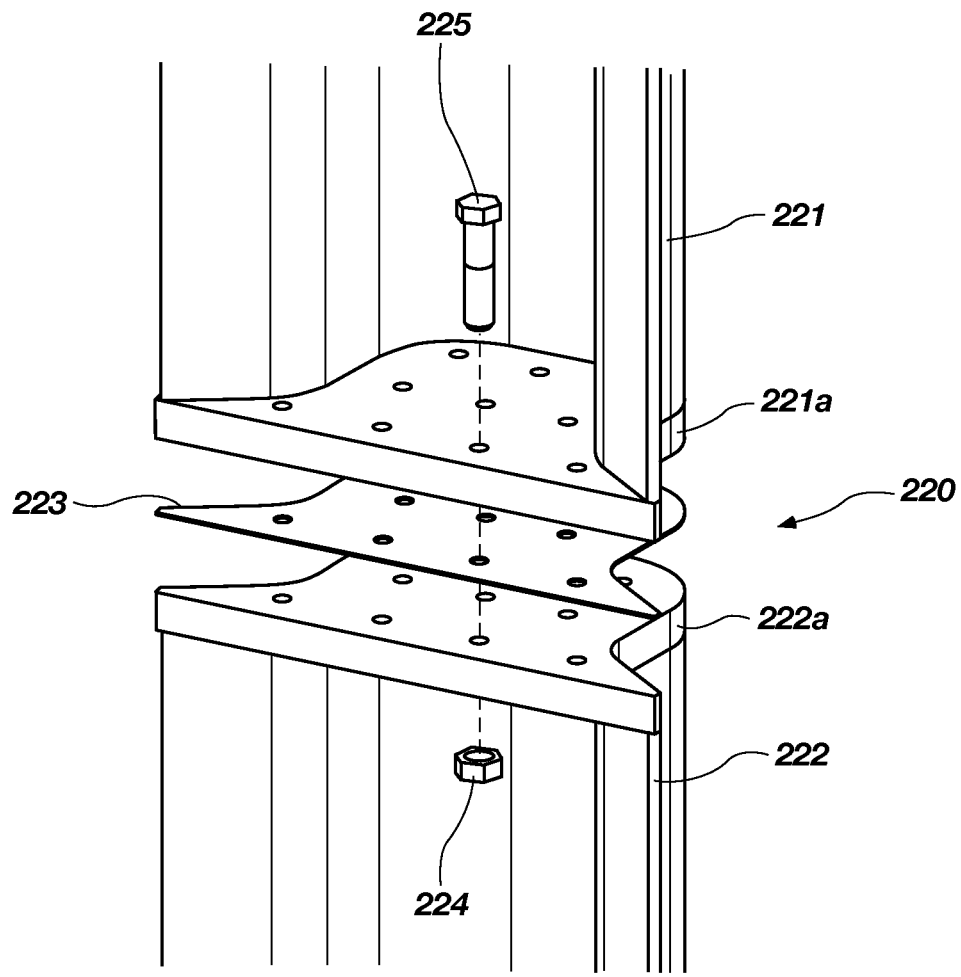
FIG. 22 is illustrative of splicing structural members.

FIG. 22 illustrates the joining or splicing of two structural members in the formation of a leg in a space frame wind tower. Splicing allows for the connection of a first structural member 221 to be placed upon a second structural member 222 thereby forming a leg portion 220. In the present embodiment the first and second structural members have ends 221a and 222a respectively formed thereon. After aligning the first and second structural members, ends 221a and 222a are affixed with fastener 225. A fastener 225 having a secondary component 224 may be used to provide the fastening of the splicing components. The fasteners may be of interference fit type. A standard bolt nut combination may also be used. A shim 223 may be employed between the first and second structural member ends thereby providing some adjustability in the leg construction in order to provide alignment of the wind tower during construction. The shim 223 may also be composed of a material with predetermined properties so as to reduce forces transmitted throughout the wind tower common bolt and nut combination to first align the splicing component and then replace said bolt and nut combination with interference fit fasteners that are more wear resistant.

Illustrated in FIGS. 23 and 24 an embodiment of the present disclosure may be formulated to optimize the cross sectional area and torsional rigidity. In the design approach, one may determine what would be the required moment of inertia along the horizontal and vertical axis of the cross section. The next step may be to determine the thickness of the cross section of a structural member. This is governed by the bearing loads in the bolted connections and the potential for buckling. The radius of curvature has a lower limit which depends on the thickness. The width of the shape has a lower limit which depends on the minimum gap required to work within the boundary of the shape with tools to tighten the bolted connections between leg members. A sensitivity analysis was carried to find out which parameter brings out the maximum change in moment of inertia while there is minim increase in the area. Each of the parameters was varied while keeping the other five parameters held constant.

In FIG. 23 the ratios between moment of inertia and the area are plotted along the vertical axis while the area of the cross section is plotted on the horizontal axis. It is observed in the plots that the contribution towards moment of inertia per unit area (along H axis) is the maximum when the length of the cross section is increased. In a separate study it is observed that the moment of inertia per unit area (along V axis) is the maximum when the width of the cross section is increased. From the above it will be appreciated to that to have an optimized shape which has the minimum area, the moment of inertia along the horizontal (along H axis) and vertical axes (along the V axis) may be controlled by the respective parameters and all other design parameters may be kept at a minimum so that they do not contribute towards an increase in area. Beyond optimizing a structural shape for inertia and cross-sectional area, other design parameters may also be considered. Length of the side flanges-the side flanges of the present structural shape function as both a structural part of the leg shape and also as the attachment area for the bracing in the tower. The angle that the bracing approaches the leg will influence the interface area needed on the side flanges but generally the combined cross sectional area of both side flanges should represent about 40% of the total cross sectional area of the present leg structural shape.

FIG. 24 represents graphically an analysis of different cross sections revealing that the present disclosure cross section has the greatest distribution of mass away from the centroid and so this is the optimum design. The inertia of the different shapes is kept as a constant to compare the different areas of different cross sections. This feature enables quatinfication of the proportionate increase in area.

Figure 25:
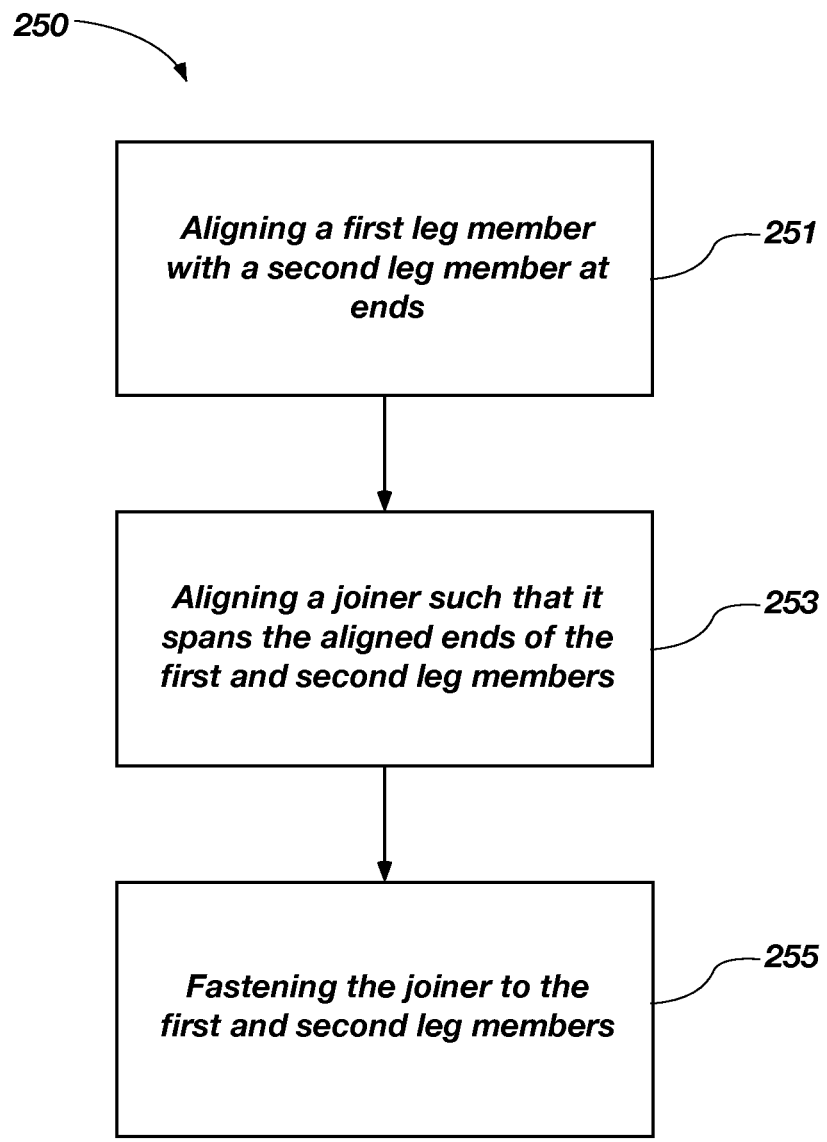
FIG. 25 is illustrative of a method for splicing structural members.

FIG. 25 illustrates a method 250 for splicing structural members together thereby forming a leg. At 215 a user aligns a first structural member with a second structural member at their respective ends. At 253 a user aligns a joiner such that it spans the aligned ends of the first and second structural members. At 255 a user fastens the joiners to the first and second structural members with a fastener as described above. Joiners may be of splicing plates and connectors described above with regard to FIGS. 19 and 20. Joiners may be a joiner structure that is affixed or a continuation of the structural member as illustrated in FIGS. 21 and 22. An embodiment of a related method may include the process of fastening the component first with common fasteners that allow for some tolerance for adjustments and then performing a second process of removing the common fasteners one at a time. Once the common fastener is removed an engineered fastener, such as an interference fit fastener may be used to provide increased wear resistance.

Figure 26:
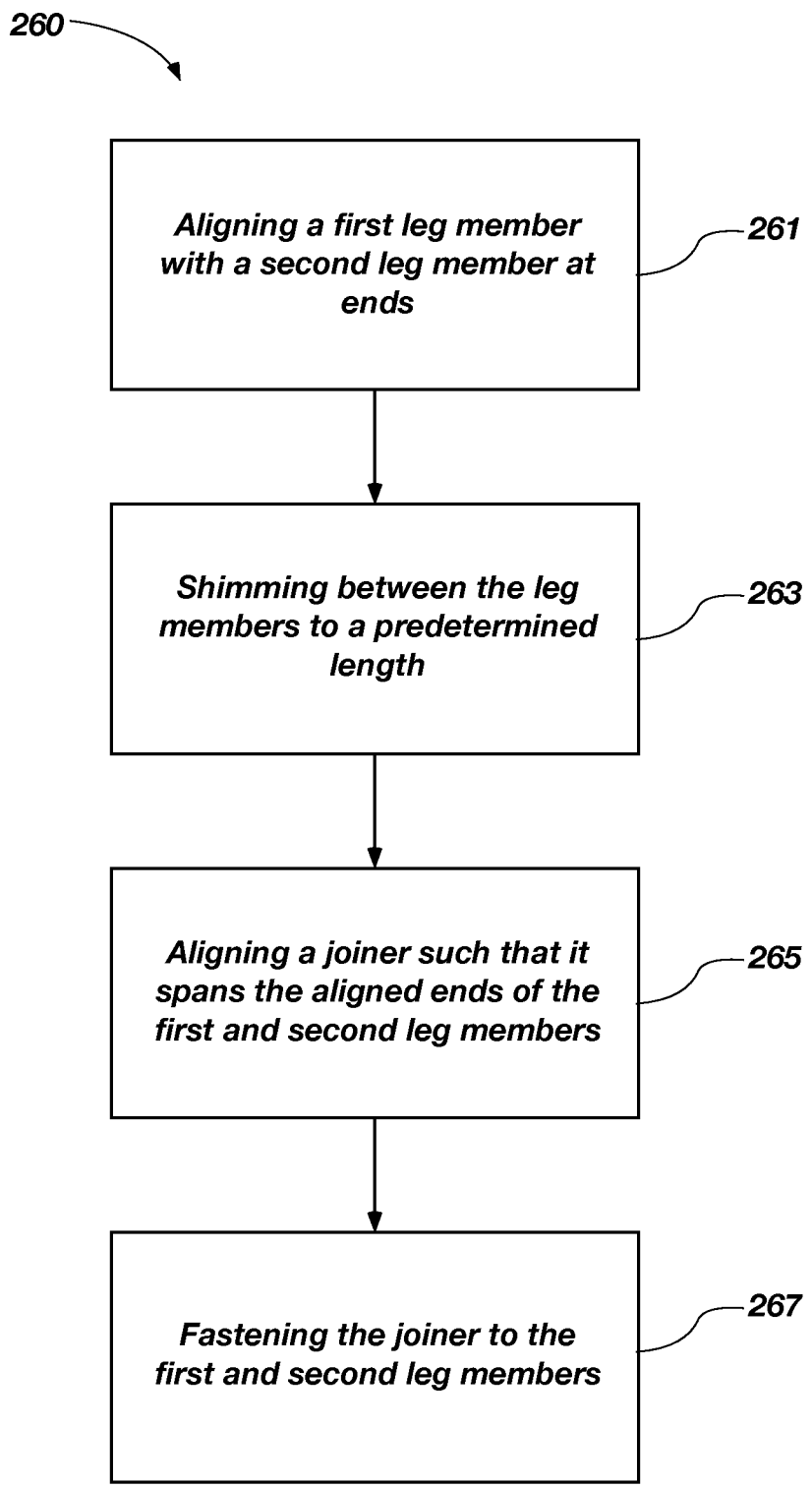
FIG. 26 is illustrative of a method for splicing and shimming structural members.

FIG. 26 illustrates a method 260 for splicing structural members together thereby forming a leg. At 261 a user aligns a first structural member with a second structural member at their respective ends. At 253 a user aligns the leg structural members by shimming spliced structural members. At 265 a user aligns a joiner such that it spans the aligned ends of the first and second structural members and the shims. At 267 a user fastens the joiner to the first and second structural members with a fastener as described above. Joiners may be of the splicing plates and connectors described above with regard to FIGS. 19 and 20. Joiners may be a joiner structure that is affixed or a continuation of the structural member as illustrated in FIGS. 21 and 22. An embodiment of a related method may include the process of fastening the components first with common fasteners that allow for some tolerance for adjustment and then performing second process of removing the common fasteners one at a time. Once the common fastener is removed an engineered fastener, such as an interference fit fastener may be used to provide increased wear resistance.

Figure 27:
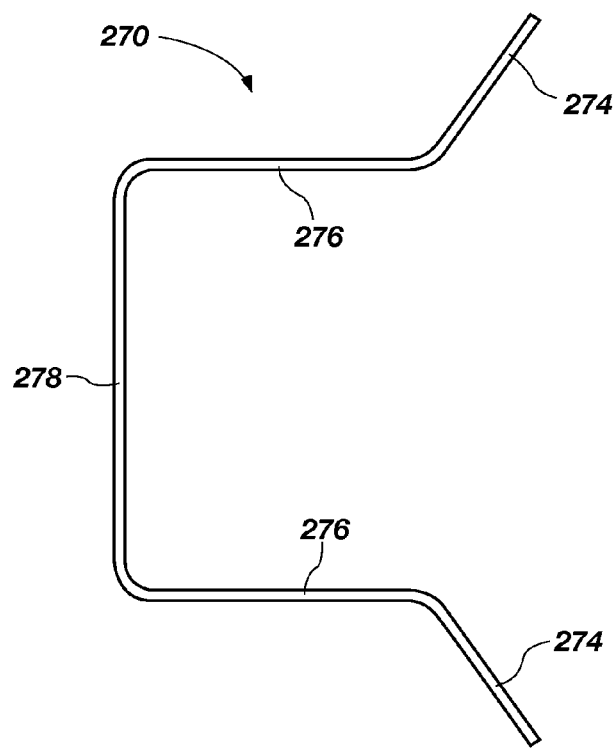
FIG. 27 is illustrative of splicing structural members.

With reference to FIGS. 27-33 a method of constructing a tower will be discussed in great detail, including structures that will be used in constructing a tower using structural members with the present disclosure. Referring to FIG. 27 the portions of a structural member will be discussed. FIG. 27 is a cross sectional view of a structural member 270 having a pair of wings or flange faces 274, a pair of side faces 276, and a front face 278.

Figure 28:
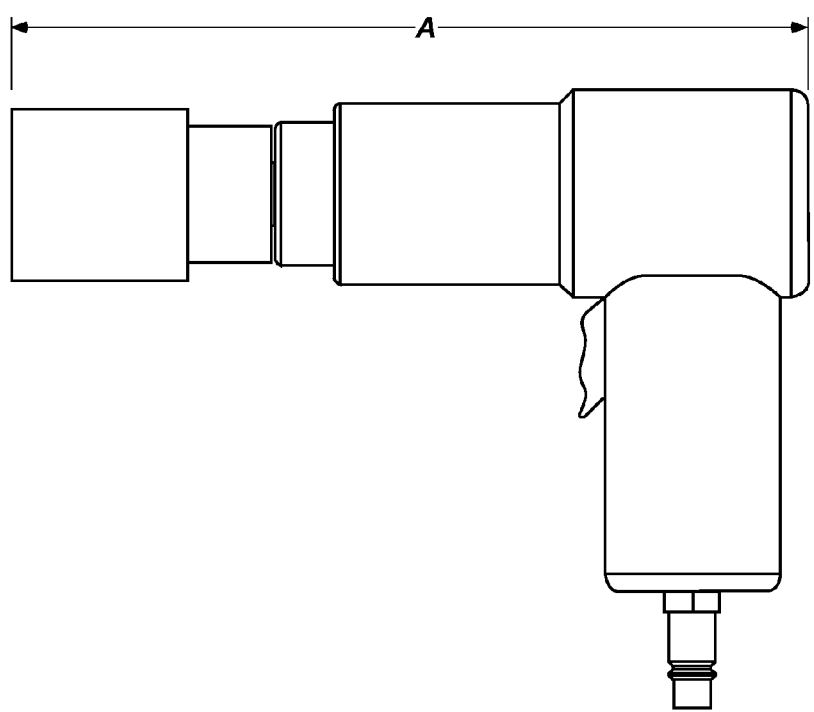
FIG. 28 is illustrative of splicing structural members.

Illustrated in FIG. 28 is an example of a tool used to install and tighten the drive pins that may be hand held and may be pneumatic and may include a reaction arm. The tool used may have a minimum rated torque capacity of 2000 ft., lbf. In addition, the tooling may be subject to the dimensional constraints defined structure member dimensions as shown in the diagram.

Figure 29:
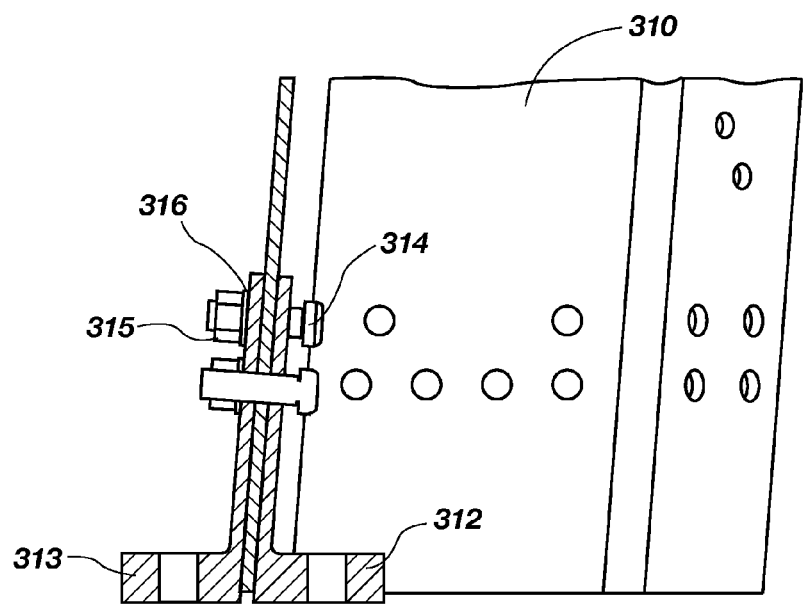
FIG. 29 is illustrative of splicing structural members.

Pre-assembled tower sections can be installed with crawler cranes. The splice plates may generally be bolted to the section top. The section may be hooked to the crane with cables and is lifted and placed on the tower. The steps illustrated below apply for all the legs in the tower. With reference to FIG. 29 a foundational structural member 310 will be discussed. Foundation splice plates 312 and 313 may be attached to the tower leg member 310 before the leg member is set on the foundation anchors. In use a user would place an inside front splice plate 312 against the inside front face at the bottom end of the leg member 310 and align the fastening holes therein. The user may then insert drive pins 314 into holes in the splice plate 312 such that the head of the drive pin 314 is on the inside of the tower leg. User then may place one washer 316 over exposed thread of drive pin 314 and hand tighten a temporary heavy hex nut onto each drive pin 314. Using the provided pneumatic tool discussed above, a user may tighten the temporary nut until the drive pin has been pulled into engagement with the splice plate 312 and the leg member 310. The user should then remove the temporary nuts 315 and the washers 316. The user may then place the outside front splice plate 313 over the drive spins 314 that are protruding from the front face of the tower leg 310. Place one washer 316 and then read one nut 315 onto each drive pin 314 as shown in the figure. The user should then use the provided pneumatic tool to tighten the nuts. Referring now to FIG. 29 the splicing of structural members will be discussed. In a first structural member 320 place a splice plate on the outer side of the front face, side and wing faces inches from the structural member 320 and insert two long bolts 325 through each plate 322. The long bolts 325 go through holes in the front face, and in the side face, and in the flange face. Place another set of splice plates 322 inches away front the structural member on the inner side of all the faces so that long bolts 325 pass through the corresponding bolt holes in the respective faces. The head of the bolt 325 is in the outside face. Insert a nut 327 on all the bolts 325.

Figure 30:
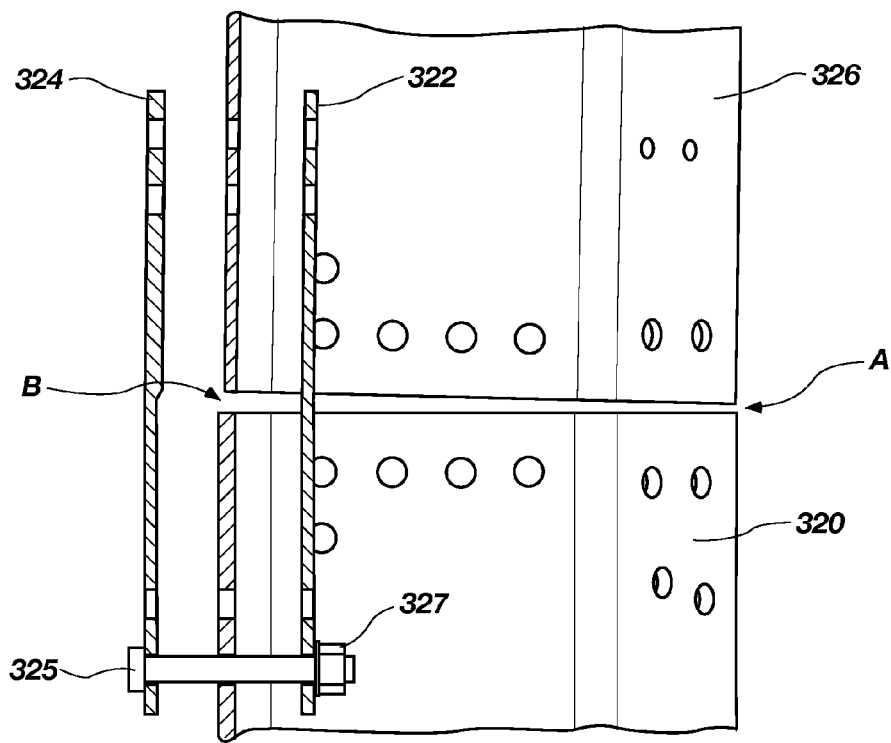
FIG. 30 is illustrative of splicing structural members.
Figure 31:
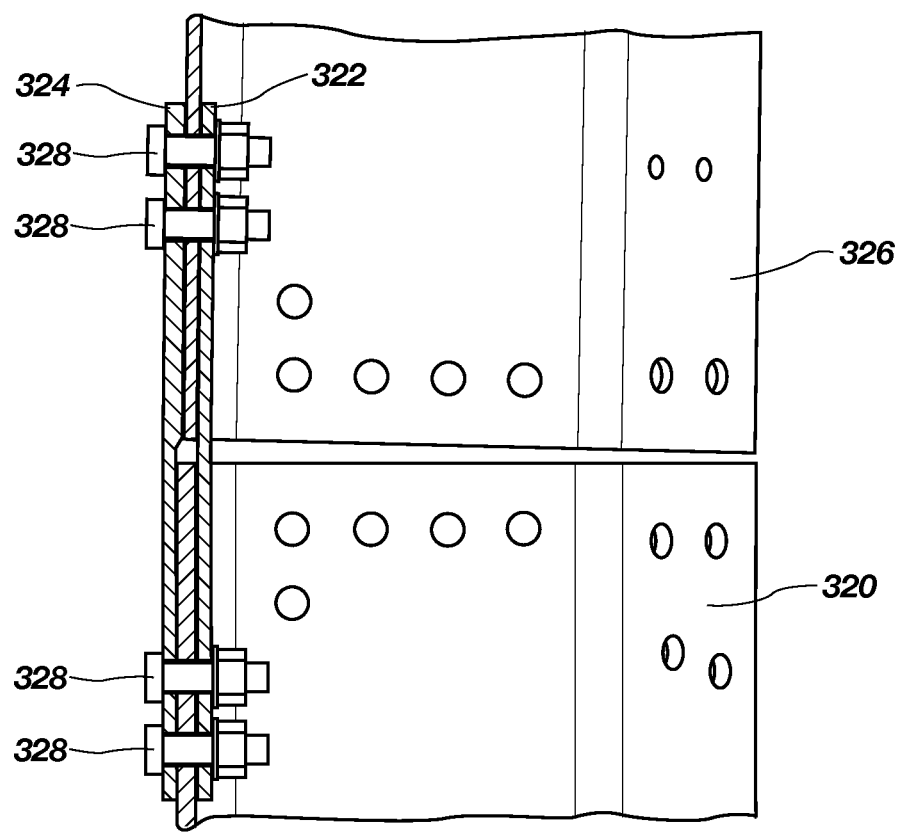
FIG. 31 is illustrative of splicing structural members.

A second structural member 326 aligned with the first structural member 320 and splice plates 324 and 322. The user may then tighten the long bolts 327 with the recommended pneumatic tool until all the splice plate 322 and 324 on the inside and outside of the front face, side and wing faces mate with the structural member surfaces as can be seen in FIG. 30. It should be noted that the splice plates may be used to align the structural members such that the legs can be adjusted during construction as indicated by and in the figure. A user may then place drive pins 328 in any remaining holes and tighten to the specification prescribed as shown in FIG. 31.

Figure 32:
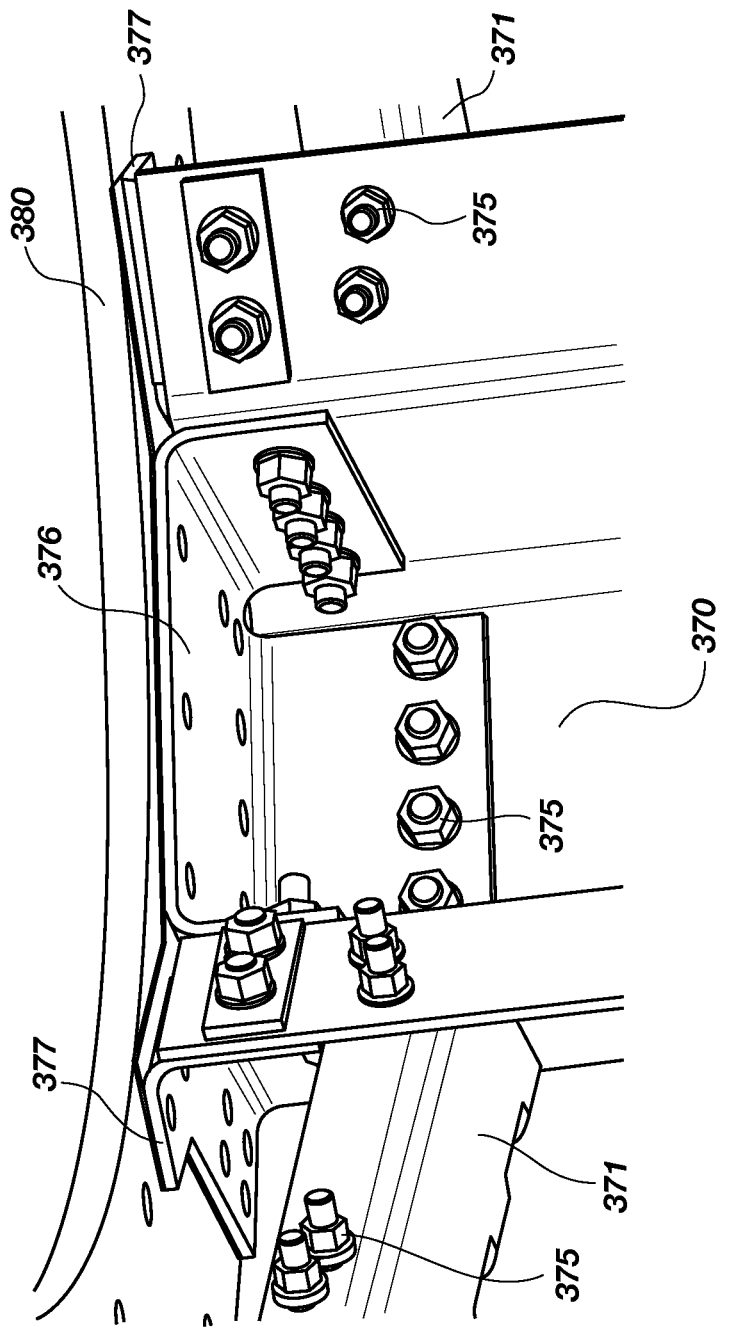
FIG. 32 is illustrative of connecting a top ring on to a wind tower.

With reference to FIG. 32 the attachment of a tower top ring 380 at the top of a structural tower will be discussed. A user may attach a tower top ring 380 to the upper most portion of a structural member 370 by use of a center bracket 376, side bracket 377 and drive pin fasteners 375. A user may first align the side bracket 377 to the bolt holes of the structural member 370 and the center bracket in the side face 276.

The user may then insert drive pins 375 through the holes in the side face 276 and brackets 377 and 376 thereby attaching the brackets to the structural member 370. A user should then use a measuring device to check if there is a difference in elevation between the top surfaces of flanges from each of a plurality of the legs. The user may then use shim plates to raise the top of any leg flange which is lower in elevation. The difference in elevation is compared to legs whose flanges have the highest top surface. Once the brackets have been leveled a user may place the tower top ring 380 on the flanges and make sure that the bolt holes in the ring align with the bolt holes in the top surface of the flanges and the shims. The user should then insert the fasteners or drive pins 375 and tighten to a specified torque thus completing the tower structure.

Figure 33:
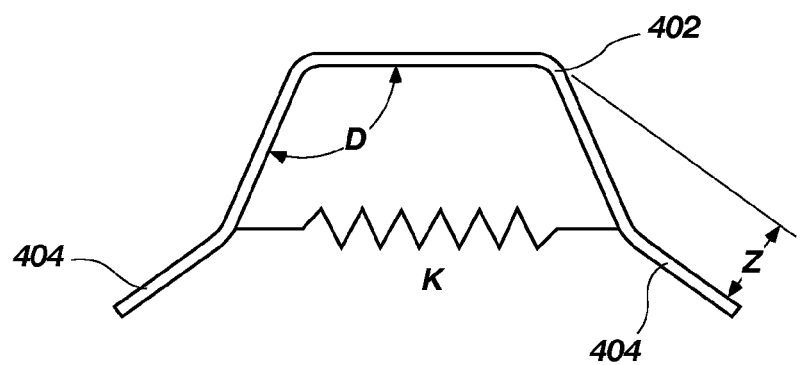
FIG. 33 is illustrative of an improved structural member.

With a reference to FIG. 33 a cross-section of a structural member will be discussed. The structural member may comprise a frame portion 402 and flange portions 404. It may be desirable to control or minimize the spring constant K of a structural member. In an embodiment the angle indicated by D in the illustration may be between 95 degrees to 140 degrees. By increasing angle D in the framed portions 402 the plane frame portion sides are put into direct conflict with the plane of deflection experienced by the structural member, thereby greatly increasing the structural rigidity and spring constant of a tower leg. By modifying the angle D a structural member may be tuned for specific applications. It should be noted also that by increasing the angle, more room is provided within the member thus allowing for greater tool use options.

While the cross sectional shape of a structural member for use in a tower leg may be optimized with the principles of the disclosure thus far, additional stiffness or simply deformation resisting support may be desired. This deformation resisting support can be implemented in a variety of configurations several of which are disclosed herein.

Figure 34:
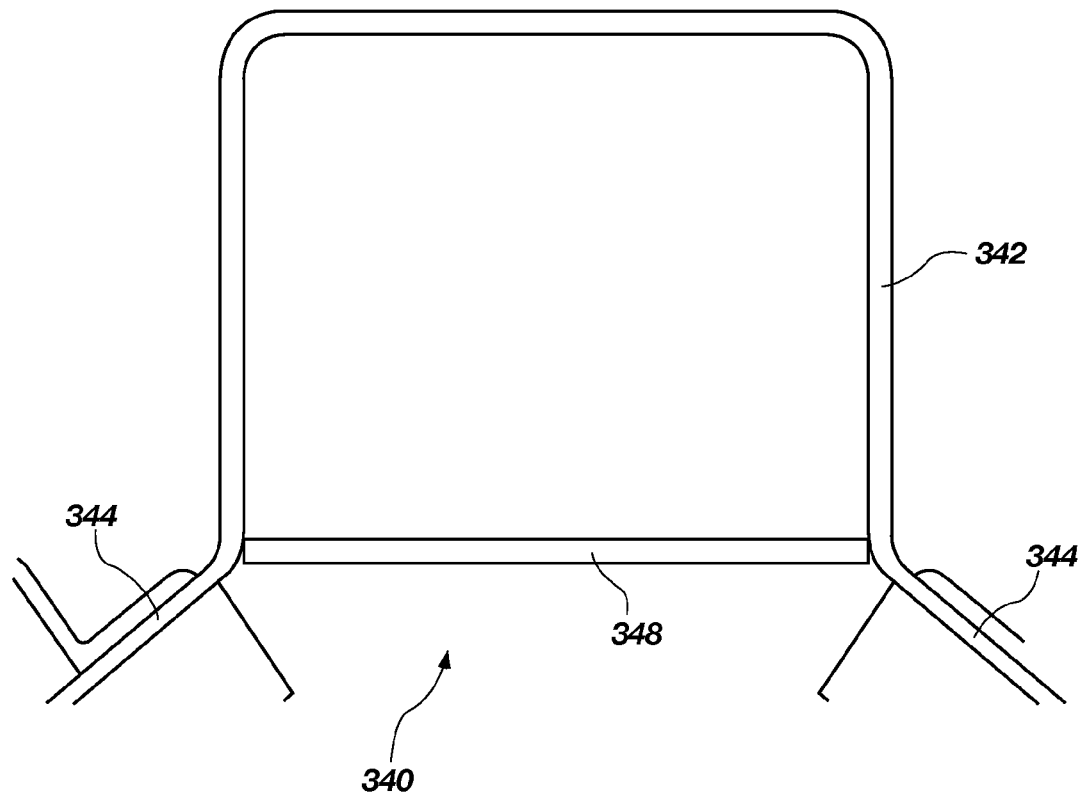
FIG. 34 is illustrative of an improved structural member.

If additional stiffness is desired or needed at infrequent intervals throughout a structural member, a cross section brace may be employed for providing additional support as illustrated in FIG. 34. The cross section brace 348 may be incorporated into a structural member 340. The structural member 340 will also comprise flange portions 344 that may be configured to offer additional strength and also provide attaching means for lattice structures. The cross section brace 348 may span a portion of the frame portion 342 of the structural member 340 and may comprise end extensions for bracing the flange portions 344.

Figure 35:
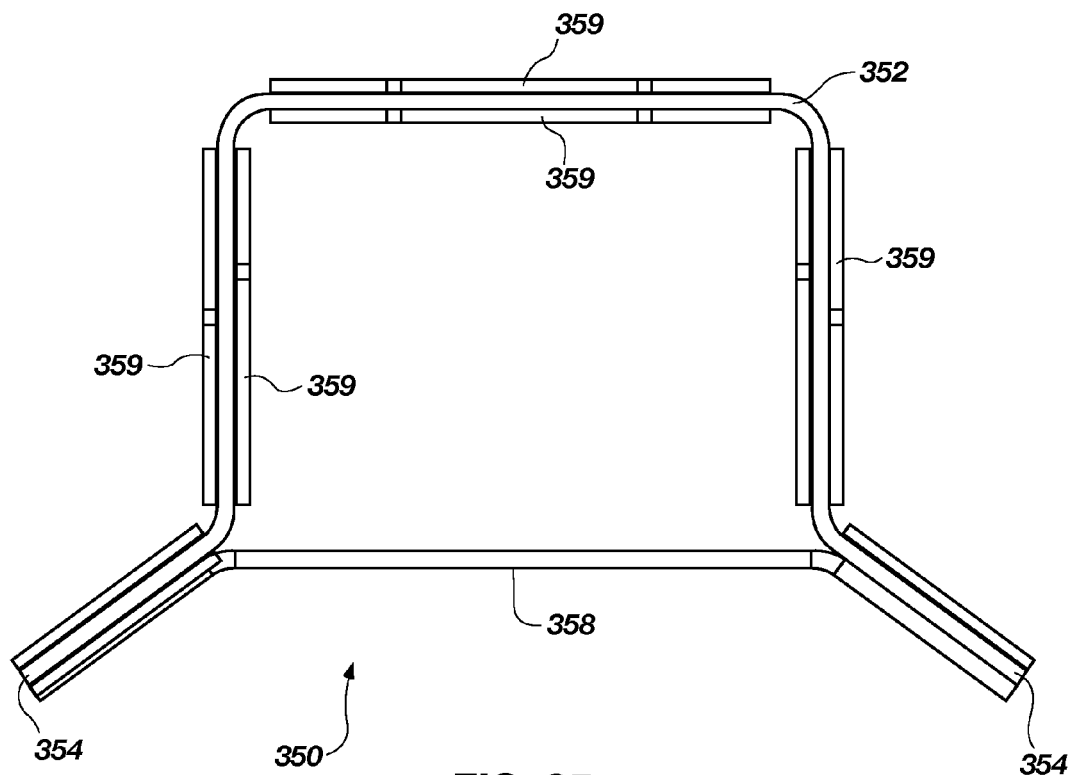
FIG. 35 is illustrative of an improved structural member.

FIG. 35 illustrates an embodiment of a structural member 350 that has been equipped with additional supports throughout. The cross section brace 358 may be incorporated into a structural member 350. The structural member 350 will also comprise flange portions 354 that may be configured to offer additional strength and also provide attaching means for lattice structures. The cross section brace 358 may span a portion of the frame portion 352 of the structural member 350 and may comprise end extensions for bracing the flange portions 354. The embodiment shows additional flat bracing members 359 that may be added to the structural member 350.

Figure 36:
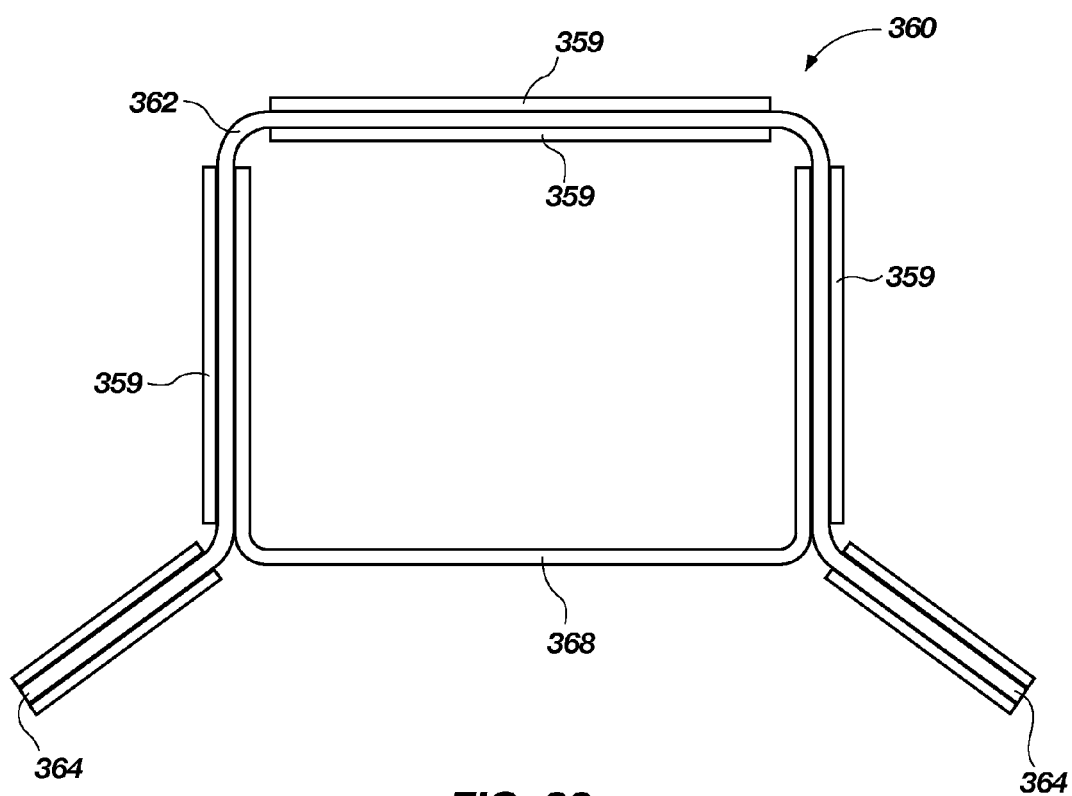
FIG. 36 is illustrative of an improved structural member.

FIG. 36 illustrates an embodiment of a structural member 360 that has been equipped with additional supports throughout. The cross section brace 368 may be incorporated into a structural member 360. The cross sectional brace 368 may be formed from a C shape that spans at least a portion of the frame portion 362 of the structural member 360. The structural member 360 will also comprise flange portions 364 that may be configured to offer additional strength and also provide attaching means for lattice structures. The cross section brace 368 may span a portion of the frame portion 362 of the structural member 360 and may comprise end extensions for bracing the flange portions 364. The embodiment shows additional flat bracing members 369 that may be added to the structural member 360.

Figure 37:
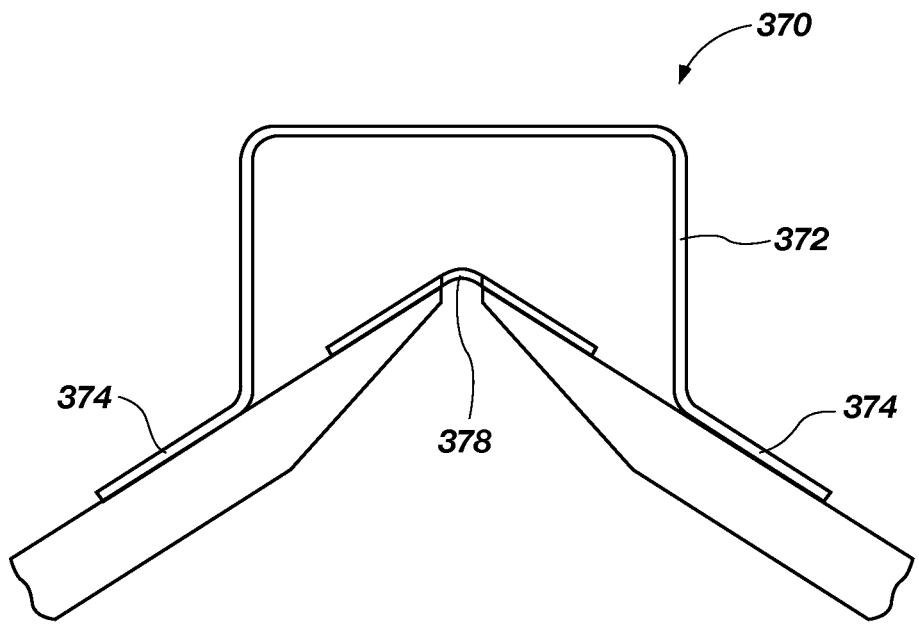
FIG. 37 is illustrative of an improved structural member.

FIG. 37 illustrates an embodiment of a structural member 370 that has been equipped with additional supports throughout. The cross section brace 378 may be incorporated into a structural member 370. The structural member 370 will also comprise flange portions 374 that may be configured to offer additional strength and also provide attaching means for lattice structures. The cross section brace 378 may span a portion of the frame portion 372 of the structural member 370 and may comprise attaching means for attaching the brace to the flange portions 374.

Figure 38:
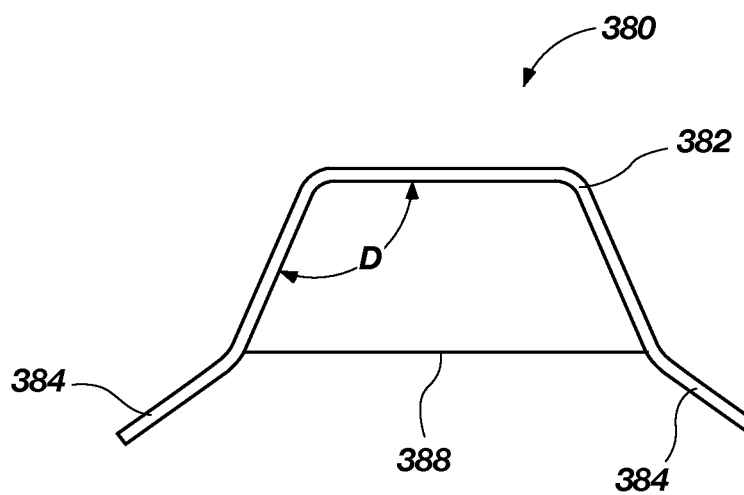
FIG. 38 is illustrative of an improved structural member.

FIG. 38 illustrates and embodiment of a structural member 380 that has been equipped with additional support. The cross section brace 388 may be incorporated into a structural member 380. The structural member 380 will also comprise flange portions 384 that may be configured to offer additional strength and also provide attaching means for lattice structures. The cross section brace 388 may span a portion of the frame portion 382 of the structural member 380 and may comprise end extensions for bracing the flange portions 384. A cross section brace may be positioned for possible local stress and deformation reduction. The cross section brace may be formed of bent steel plate that can either be the full length of the tower leg or can be localized to shorter lengths. There are multiple ways to attach the cross section brace and multiple shapes. Attachment methods considered may be bolting the plate to both of the flanges or bolting the cross section brace to inner walls of the shape where interface with the flanges does not have to occur. An embodiment may use welding of the cross section brace to the structural member. An embodiment may utilize mechanical interface to connect one side of the cross section brace while bolting the opposite side to the opposite the other side. The cross section brace may be shaped to maximize the moment of inertia of the combined shape of the structural member and the cross section brace. The cross section brace which is localized may readily be applied at each of the structural member splicing points along the tower leg and can also readily be used at the tower leg to tower leg joints of a tower. At these leg-to-leg joints the cross section brace can either be utilized near the end of each leg or the cross section brace can also be used as a leg-to-leg splice plate thereby spanning from one leg to the next as it is joined to both.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concept set forth herein.

In the foregoing Detailed Description, various features of the present disclosure are grouped together into single embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A wind tower comprising:
   a plurality of legs, each of said plurality of legs comprising a structural member, said structural member having an open cross section defining a substantially unobstructed inner surface facing toward a midpoint of the tower, said open cross section comprising:
   two flange portions for attaching said structural member into said wind tower,
   a framed portion connecting said flange portions so as to define an outermost cavity of said structural member, wherein said cavity extends radially outward from the midpoint of the tower, and
   wherein said flange portions and said framed portion are extended substantially normal to the open cross section thereby forming said structural member.

2. The wind tower of claim 1, at least four legs comprising said structural members.

3. The wind tower of claim 2, said structural members further comprising a joining structure disposed thereon for joining.

4. The wind tower of claim 1, five legs comprising said structural members.

5. A space frame wind tower comprising:
a plurality of legs, each of said plurality of legs comprising a structural member, said structural member having an open cross section defining a substantially unobstructed inner surface facing toward a midpoint of the tower, said open cross section comprising:
two flange portions for attaching said structural member into said wind tower,
a framed portion connecting said flange portions so as to define an outermost cavity of said structural member, wherein said cavity extends radially outward from midpoint of the tower, and
wherein said flange portions and said framed portion are extended substantially normal to the open cross section thereby forming said structural member.

6. The space frame wind tower of claim 5, wherein the structural member further comprises a flat portion.

7. The space frame wind tower of claim 6, wherein said flat portion is disposed between a convex portion and a concave portion.

8. The space frame wind tower of claim 7, wherein said concave portion is adjacent to one of the flange portions.

9. The space frame wind tower of claim 7, wherein the concave portion has a radius of curvature that is less than 5 times the thickness but greater than a thickness of any portion of the cross section.

10. The space frame wind tower of claim 7, wherein the convex portion has a radius of curvature that is equal to or greater than a thickness of any portion of the cross section.

11. The space frame wind tower of claim 6, wherein said flat portion is disposed between said flange portions.

12. The space frame wind tower of claim 5, wherein the structural member further comprises a plurality of flat portions.

13. The space frame wind tower of claim 5, wherein the ratio between moment of inertia and the area of the cross section is in the range from about 25 to about 300 in$^4$.

14. The space frame wind tower of claim 5, wherein the moment of inertia is in the range from about 800 to about 10000 in$^4$.

15. The space frame wind tower of claim 5, wherein the moment of inertia is in the range from about 1500 to about 4500 in$^4$.

16. The space frame wind tower of claim 5, wherein the area of the cross section is in the range from about 30 to about 210 in$^2$.

17. The space frame wind tower of claim 5, wherein the area of the cross section is in the range from about 50 to about 110 in$^2$.

18. The space frame wind tower of claim 5, wherein the cross section is asymmetric.

19. The space frame wind tower of claim 5, wherein the cross section is symmetric about an axis.

20. The space frame wind tower of claim 5, wherein the structural member is formed by more than one segment bonded together by a fastener across the length of the cross section.

21. The space frame wind tower of claim 5, wherein the structural member is formed by just one continuous piece of material.

22. The space frame wind tower of claim 5, wherein the length of the flange portions is between about 15% to about 25% of the total perimeter of the cross section.

23. The space frame wind tower of claim 5, wherein the length of the flange portions is substantially about 10% to about 15% of the total perimeter of the cross section.

24. The space frame wind tower of claim 5, wherein the angle between the flanges is dependent on the number of legs to be used in the wind tower structure.

25. The space frame wind tower of claim 5, wherein the angle between the flanges is the product of 180 degrees multiplied by the number of legs to be in the final tower structure minus two; and wherein the product is then divided by two multiplied by the number of legs to be in the final tower.

26. The space frame wind tower of claim 5, wherein the ratio between the width of the cross section and the perimeter of the frame portion is within the range from about 0.8 to about 0.2.

27. The space frame wind tower of claim 5, wherein the ratio between the width of the cross section and the perimeter of the frame portion is substantially about 0.7 to about 0.35.

28. The space frame wind tower of claim 5, wherein said structural member further comprises a brace spanning at least a portion of said framed portion.

29. The space frame wind tower of claim 5, wherein the thickness of the cross section is in the range from about 0.25 to about 1.125 in.

30. The space frame wind tower of claim 5, wherein the thickness of the cross section is in the range from about 0.375 to about 1 in.

31. The space frame wind tower of claim 5, wherein the thickness of the cross section is in the range from about 0.4375 to about 0.875 in.

32. The space frame wind tower of claim 5, wherein the ratio of the thickness and the perimeter of cross section is in the range from about 0.005 to about 0.03 in.

33. The space frame wind tower of claim 5, wherein the ratio of the thickness and the perimeter of cross section is in the range from about 0.005 to about 0.02 in.

34. The space frame wind tower of claim 5, wherein the thickness of the cross section is constant along the length of the leg.

35. The space frame wind tower of claim 5, wherein the thickness of the cross section varies along the length of the leg.

36. The space frame wind tower of claim 5, wherein an angle formed between said flange portion and said frame portion ranges between about 80 degrees and about 175 degrees.

37. The space frame wind tower of claim 5, wherein the structural member further comprises a brace wherein said brace comprises a first end and a second end and wherein said first end is affixed to a flange and wherein said second end is attached to another flange.

38. The space frame wind tower of claim 37, wherein said brace is affixed to said framed portion.

39. The space frame wind tower of claim 5, wherein the structural member has the ratio between the depth dimension, length (l), of the shape and the perimeter of the box shaped frame as about 0.5>(l/box perimeter)>about 0.15.

40. The space frame wind tower of claim 5, wherein the structural member has the ratio between the depth dimension, length (l), of the shape and the perimeter of the box shaped frame as about 0.35>(l/box perimeter)>about 0.2.

41. The space frame wind tower of claim 5, wherein the outer perimeter of the cross section is in the range from about 50 to about 130 in.

42. The space frame wind tower of claim 5, wherein the outer perimeter of the cross section is in the range from about 50 to about 100 in.

43. The space frame wind tower of claim 5, wherein the structural member is made of a metal.

44. The space frame wind tower of claim 5, wherein the structural member is fabricated by a metal forming process.

45. The space frame wind tower of claim 44, wherein the structural member is fabricated out of a steel plate using a press brake forming process.

46. The space frame wind tower of claim 44, wherein the structural member is fabricated out of coil using a press brake forming process.

47. The space frame wind tower of claim 44, wherein the structural member is fabricated out of steel plate using a cold roll forming process.

48. The space frame wind tower of claim 44, wherein the structural member is fabricated out of coil using a cold roll forming process.

49. A wind tower comprising:
- a structural member for use in constructing a wind tower comprising, wherein said structural member comprises an open cross section defining a substantially unobstructed inner surface facing toward a midpoint of the tower, wherein said structural member forms a framed portion and flange portions, wherein the framed portion defines an outermost cavity of said structural member, wherein said cavity extends radially outward from a midpoint of the tower, wherein the framed portion and flange portions are extended substantially normal to a cross section of said structural member:
- means for attaching other structures to said structural member for constructing a lattice thereby forming said wind tower;
- means for resisting compressive loading for preserving the structural integrity of said wind tower; and
- means for resisting torsional loading for preserving the structural integrity of said wind tower.

\* \* \* \* \*